US008045687B2

(12) United States Patent
Ueshima

(10) Patent No.: US 8,045,687 B2
(45) Date of Patent: Oct. 25, 2011

(54) CALL-CONNECTING DEVICE, CALL-CONNECTING METHOD, CALL-CONNECTING PROGRAM, AND CALL-ACCEPTING SERVER

(75) Inventor: Yasushi Ueshima, Tokyo (JP)

(73) Assignee: Comsquare Co., Ltd., Tokyo (JP)

( * ) Notice: Subject to any disclaimer, the term of this patent is extended or adjusted under 35 U.S.C. 154(b) by 874 days.

(21) Appl. No.: 12/024,761

(22) Filed: Feb. 1, 2008

(65) Prior Publication Data

US 2008/0130843 A1 Jun. 5, 2008

Related U.S. Application Data

(63) Continuation of application No. PCT/JP2006/315333, filed on Aug. 2, 2006.

(30) Foreign Application Priority Data

Aug. 3, 2005 (JP) .................................. 2005-225325
Dec. 28, 2005 (JP) .................................. 2005-378512

(51) Int. Cl.
*H04M 15/00* (2006.01)
*H04M 3/00* (2006.01)

(52) U.S. Cl. .............................. 379/114.13; 379/266.07

(58) Field of Classification Search .................. 379/111, 379/114.01, 114.13, 133, 201.01, 211.01, 379/266.07, 266.1, 221.11, 221.14
See application file for complete search history.

(56) References Cited

U.S. PATENT DOCUMENTS

| 4,907,260 | A  | * | 3/1990  | Prohs et al. | ................... 379/224 |
| 6,614,781 | B1 | * | 9/2003  | Elliott et al. | .................. 370/352 |
| 7,120,235 | B2 | * | 10/2006 | Altberg et al. | ........... 379/114.13 |

FOREIGN PATENT DOCUMENTS

| JP | 2002-300323 | 10/2002 |
| JP | 2002-312687 | 10/2002 |

* cited by examiner

*Primary Examiner* — Quoc D Tran
(74) *Attorney, Agent, or Firm* — Ditthavong Mori & Steiner, P.C.

(57) ABSTRACT

A server system includes a database having an identification number and a contact destination number as associated information; a storage device for containing the database; a call-accepting unit for accepting a call designating an advertised telephone number from a user's telephone as well as for extracting the identification number therefrom; a contact destination-extracting unit for extracting the contact destination number associated with the identification number from the database; and a connection-processing unit for connecting the call from a user's telephone to the telephone of an advertiser corresponding to the contact destination number according to the extracted contact destination number.

25 Claims, 12 Drawing Sheets

| | 611A2 | | | | 611A5 | | |
|---|---|---|---|---|---|---|---|
| | 611A2A | 611A2B | | | 611A5A | 611A5B | |
| IDENTIFICATION NUMBER | ADVERTISING BUSINESS | CONTACT DESTINATION NUMBER | ADVERTISING BUSINESS | ADVERTISING MEDIA | PUBLISHING-COMMENCEMENT DATE/TIME | PUBLISHING-TERMINATION DATE/TIME | BUSINESS HOURS |
| 0010101 | AAA | 0312345678 | ○○○○ | WEBSITE | 2005/10/01 11:00 | 2005/10/31 24:00 | 9:00~17:00, CLOSED ON □day |
| 0010102 | AAA | 0312345678 | ○○○○ | MAGAZINE | 2005/10/05 9:00 | 2005/11/12 24:00 | 9:00~17:00, CLOSED ON □day |
| 0010201 | AAA | 0312345678 | △△△△ | WEBSITE | 2005/10/01 9:00 | 2005/10/31 24:00 | 9:00~17:00, CLOSED ON □day |
| 0020101 | BBB | 0387654321 | ○○○○ | WEBSITE | 2005/10/01 11:00 | 2005/11/30 24:00 | 10:00~20:00, CLOSED ON △day |
| …  | …  | …  | …  | …  | …  | …  | …  |

| INCOMING CALLER ID | CALLER NUMBER | COMMENCEMENT TIME | TERMINATION TIME | CONVERSATION TIME | ADVERTISER | ADVERTISING BUSINESS | IDENTIFICATION NUMBER |
|---|---|---|---|---|---|---|---|
| 209000000 | 0333345678 | 2005/10/10 15:00:00 | 2005/10/10 15:01:30 | 90 | AAA | ○○○○ | 0010101 |
| ..... | | | | | | | |
| 209000100 | 0311223344 | 2005/11/07 15:00:00 | 2005/11/07 15:02:30 | 150 | AAA | △△△△ | 0010102 |
| ..... | | | | | | | |
| 209000200 | NO | 2005/11/03 15:00:00 | 2005/11/03 15:02:30 | 150 | BBB | ○○○○ | 0020101 |
| ..... | | | | | | | |

FIG. 4

CALL-CONNECTING DEVICE, CALL-CONNECTING METHOD, CALL-CONNECTING PROGRAM, AND CALL-ACCEPTING SERVER

CROSS-REFERENCE TO RELATED APPLICATIONS

The present application is a continuation application of PCT/JP2006/315333 filed Aug. 2, 2006, which claims priority of Japanese Patent Application Nos. 2005-225325 filed Aug. 3, 2005, and 2005-378512 filed Dec. 28, 2005. The contents of these applications are incorporated herein by reference in their entirety.

BACKGROUND OF THE INVENTION

1. Field of the Invention

The present invention relates to a call-connecting device, a call-connecting method, a call-connecting program, and a call-accepting server.

2. Discussion of the Background

Conventionally, a so-called pay-per-call type of system is known whereby users call advertisers according to advertised information published in magazines or the like, and then the magazine publisher charges the store owners relevant fees according to the frequency of the phone calls.

Advertisements using this type of pay-per-call are provided by publishing telephone numbers used for the advertisements (advertised telephone number) together with the advertised information provided by the advertisers in publications such as Web pages on a Web site on the Internet, newspapers, and magazines. For example, such advertisements are provided by administrators for the Web sites and magazine publishers who act as an agency (e.g., advertising agency) for example, on behalf of the advertiser itself.

Thus, once a user who has browsed such advertised information makes a call to the advertiser at the advertised telephone number that has been published together with the advertised information, the number of calls are tallied, and then the advertising fees are charged to the advertiser according to the number thereof (e.g., see Japanese Patent Application Publication Nos. 2002-300323 and 2002-312687).

Japanese Patent Application Publication No. 2002-300323 discloses that a call made by a user from a user terminal is transferred to an advertiser who provides advertised information corresponding to a push-button signal sent from the user terminal, and then the conversation history for this transferred telephone is recorded. Thereafter, the amount charged for the transfer is calculated according to the conversation history, and this calculated charged amount is recorded per advertiser and charged to the relevant advertiser.

Additionally, Japanese Patent Application Publication No. 2002-312687 discloses that a hiring company concludes a contract with an advertising company for registering a contact destination number as a contract number, and the advertising company registers, with a telephone office, a toll-free (free telephone conversation) transfer service in which the contract number is a transfer destination, and then discloses job information, including the public number that is a transfer source number. Once an applicant makes a call to the public number after checking the job information, the telephone office transfers the call to the hiring company and counts the number of conversations, and then charges the hiring company with the information usage fees in addition to the conversation charges. This case adopts a system in which the difference in the amount whereby an agency commission is deducted from the amount of payment made by the hiring company is paid by the telephone office to the advertising company.

The contents of Japanese Patent Application Publication Nos. 2002-300323 and 2002-312687 are incorporated herein by reference in their entirety.

However, the configuration of Japanese Patent Application Publication No. 2002-300323 has the problem that operation is troublesome, because the user needs to specify the advertiser by operating push-buttons according to a voice message made by an IVR (Interactive Voice Response) responding unit until the telephone call between the user and the advertiser is connected.

Additionally, the configuration of Japanese Patent Application Publication No. 2002-312687 has the problem that it is impossible to identify which advertisements were effective if the advertiser requests advertisements by a plurality of agencies and if a plurality of advertisements are published on different dates. For example, it is impossible to distinguish the calls made by checking the job information from the calls made to the advertiser with the contract number that has been passed directly from other people without browsing the job information. In addition, in a case in which similar services are received with one contract number from among a plurality of advertising companies, the telephone office cannot identify the adverting companies, so the effectiveness of the advertisement cannot be distinguished per advertising company.

SUMMARY OF THE INVENTION

According to one aspect of the present invention, a call-connecting device includes a database having an identification number and a contact destination number as associated information, a storage device for containing the database, a call-accepting unit for accepting a call from a first telephone designating a telephone number including the identification number as well as for extracting the identification number from the telephone number, a contact destination-extracting unit for extracting the contact destination number associated with the identification number from the database according to the extracted identification number; and a connection-processing unit for connecting the call from the first telephone to a second telephone corresponding to the contact destination number according to the extracted contact destination number.

The database may have one identification number and a plurality of contact destination numbers as associated information, or the database may have a plurality of identification numbers and one or a plurality of contact destination numbers as associated information.

The call-accepting unit may extract the identification number from the telephone number after making an incoming call response to the call, or may extract the identification number from the telephone number without making an incoming call response to the call.

The connection-processing unit may include a response-detecting unit for detecting an incoming call response of the second telephone; and a conversation-connecting unit for connecting a call from the first telephone to the second telephone so as to enable the conversation according to an incoming call response of the second telephone.

The call-connecting device may further include a conversation-processing unit for transmitting conversation voice information from either the first telephone or the second telephone to the other telephone.

The call-connecting device may further include a history-recording unit for recording at least the history of the call or the history of a conversation connected by the connection-processing unit to the storage device with association to the identification number.

The call-connecting device may further include a history-outputting unit for outputting telephone call history information corresponding to each of the identification numbers according to at least the call history or the conversation history.

The call-connecting device may further include a charge-processing unit for generating information of charges corresponding to each of the identification numbers according to at least the call history or the conversation history.

The call-connecting device may further include an error-detecting unit for detecting errors according to the frequency of calls.

The call-connecting device may further include an identification number-generating unit for automatically generating identification numbers.

The call-connecting device may further include a timer unit for measuring the current time, and the connection-processing unit may connect the call to a second telephone corresponding to the contact destination number, only in the case in which the time for the call, which has been measured by the timer unit, is within the range of a specific period.

The database further has a connectable time for each of the contact destination numbers as associated information of the identification number, and the connection-processing unit may connect the call to a second telephone corresponding to the contact destination number, only in the case in which the call time is within the connectable time.

According to another aspect of the present invention, a call-connecting method includes the steps of: accepting a call from a first telephone designating a telephone number including an identification number that has been stored within a database by being associated with a contact destination number, extracting the identification number from the telephone number, extracting the contact destination number associated with the identification number from the database, according to the extracted identification number; and connecting a call from the first telephone to a second telephone corresponding to the contact destination number according to the contact destination number.

In the step of extracting the identification number, the identification number may be extracted from the telephone number after making an incoming call response to the call, or may be extracted from the telephone number without making an incoming call response to the call.

Additionally, the step of connecting the call may include the steps of: detecting an incoming call response of the second telephone; and connecting a call from the first telephone to the second telephone so as to enable the conversation according to an incoming call response of the second telephone.

The call-connecting method may further include a step of transmitting conversation voice information from either the first telephone or the second telephone to the other telephone.

The call-connecting method may further include a step of recording at least either a history of the call or a history of a conversation connected by the connection-processing unit to the storage device with association to the identification number.

The call-connecting method may further include a step of outputting telephone call history information corresponding to each of the identification numbers according to at least the call history or the conversation history.

The call-connecting method may further include a step of generating information of charges corresponding to each of the identification numbers according to at least the call history or the conversation history.

The call-connecting method may further include a step of detecting errors according to the frequency of calls.

In the step of connecting the call, the call may be connected to a second telephone corresponding to the contact destination number, only in the case in which the time of the call is within the range of a specific period.

According to further aspect of the present invention, a call-connecting program causes a computer to function as: a call-accepting unit for accepting a call from a first telephone designating a telephone number including an identification number that has been stored within a database by being associated with a contact destination number as well as for extracting the identification number from the telephone number, a contact destination-extracting unit for extracting the contact destination number associated with the identification number from the database according to the extracted identification number; and a connection-processing unit for connecting the call from the first telephone to a second telephone corresponding to the contact destination number according to the extracted contact destination number.

According to further aspect of the present invention, a call-accepting server accepts a call designating an advertised telephone number having: a telecommunications company-specific number of at least four digits, which has been allocated to each telecommunications company, a server-specific number of at least three digits, which has been allocated to each call-accepting server; and an identification number of at least fourteen digits, which has been allocated for each set of advertised information, said identification number includes an agency number that indicates an agency that provides advertised information and an advertisement-specific number that identifies the advertised information, and thereafter automatically selects the telephone number of a connection destination according to the identification number.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings; wherein:

FIG. 3 is a structure diagram for explaining a data structure that is recorded in an area for recording advertising-related information within a database constructed in the server system shown in FIG. 2;

FIG. 4 is a structure diagram for explaining a data structure that is recorded in an area for recording communication log within a database constructed in the server system shown in FIG. 2;

DESCRIPTION OF THE EMBODIMENTS

Figure 1:
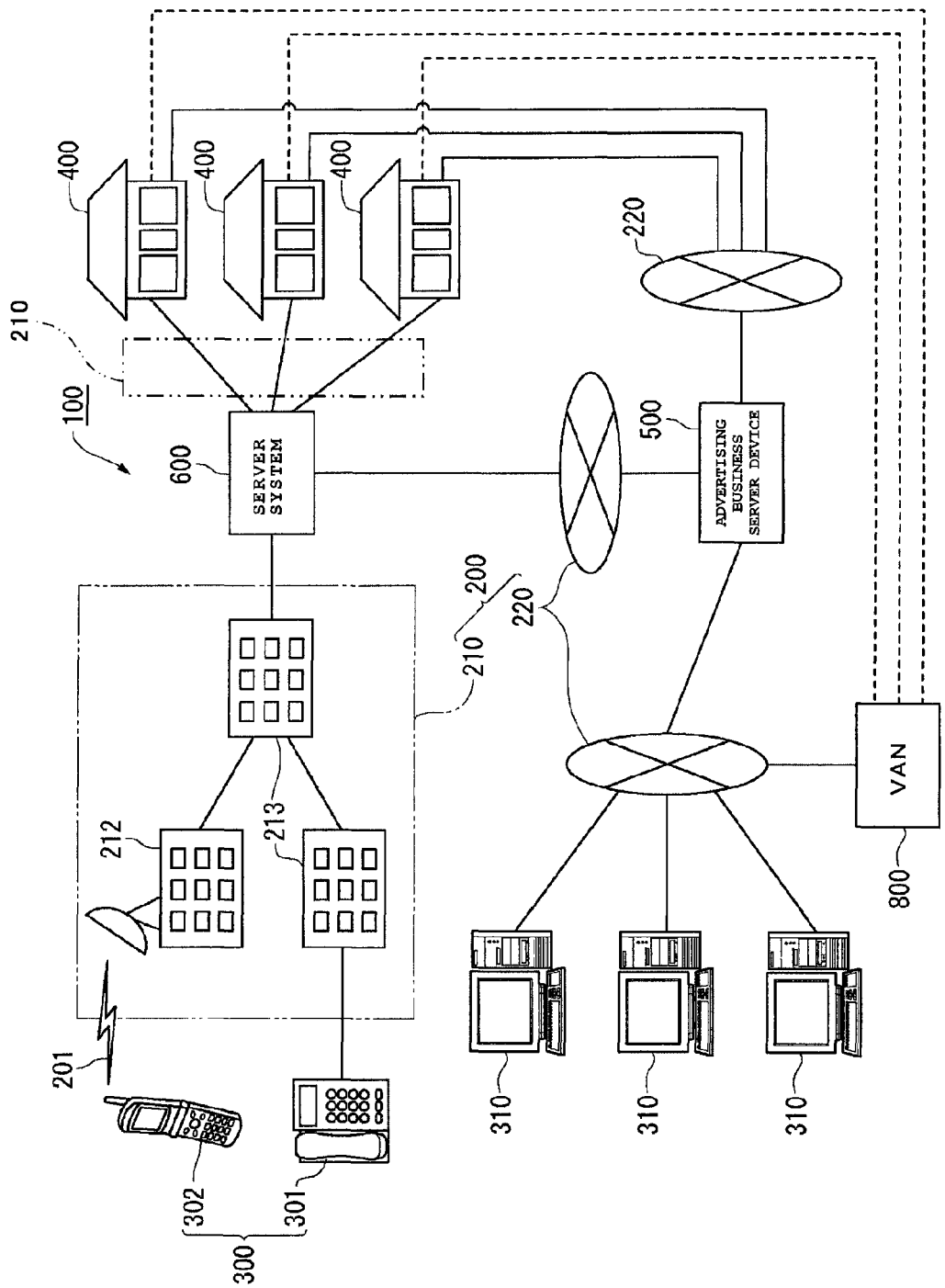
FIG. 1 is a schematic block diagram showing the entire configuration of an advertising system including a call-accepting device according to an embodiment of the present invention.

The embodiments will now be described with reference to the accompanying drawings, wherein like reference numerals designate corresponding or identical elements throughout the various drawings.

In the embodiments, the expressions "a telephone call (call) is connected," "a telephone is connected," and "a telephone line is connected" are used as having substantially the same meaning. In any case, it means that "one telephone connected to one telephone line allocated for one telephone number is connected." "Calling at a telephone number," "calling to a telephone," and "calling to a telephone line" are also used with the same meaning.

In addition, "incoming call" means a situation in which a call is made to a telephone and "calling-out" is made to that telephone, and "responding to an incoming call" means a situation in which a response is made to the "call-out," or in other words, a situation in which a telephone call is being answered.

"Transfer of a telephone call" means an operation in which a call is received from one telephone, and the call is thereafter made to another telephone so that one telephone is connected to another telephone, and "shifting of a telephone call" means an operation in which a call is made to another telephone without receiving the call so that one telephone is connected to another telephone.

Embodiments of the present invention relate to a call-connecting device for connecting a call designating a specific telephone number to another contact destination corresponding to that telephone number. A call-connecting device, a call-connecting method, a call-connecting program, or a call-accepting server according to the embodiments of the present invention is preferably used for an advertising system or the like to connect a call designating a telephone number listed in advertised information that has been provided by publishing it in newspapers, magazines, TV broadcasts, radio broadcasts, and/or Web pages, to an advertiser's telephone having another telephone number.

In one embodiment, a case is described in which this call-connecting device is used for an advertising system that provides advertising and a process for charging for the same. This call-connecting device connects a call to an advertiser's telephone in the case in which a user makes a call to a telephone number (advertised telephone number) that has been published in advertised information provided by an agency according to a request made by an advertiser. Thereafter, information of charges is also generated so that the agency can charge the consideration to the advertiser according to the conversation history.

As used herein, advertiser refers to a store owner, a company that sells products or provides services, or an individual who desires to place advertisements, and agency refers to an operating company such as a publishing company that publishes in magazines or a business company that managers a Web site, an advertising business such as an advertising company, and an advertising agency that mediates between the advertiser and the advertising business.

This embodiment exemplifies an advertising system in which an agency exists but is not limited to this case, and the agency may be the same as an administrator who manages a conversation-based charging processor. In addition, examples of the advertised information include various public information such as advertised information for restaurants, advertised information and employment information for retailers, and information regarding attracting students to schools. In the event that the compensation is incurred to such advertised information, cases in which the compensation is not incurred may obviously be included.

FIG. 1 shows a block diagram of a schematic structure of an advertising system 100 comprising a call-accepting device according to this embodiment. This advertising system 100 is a so-called pay-per-call type of advertising system in advertising agency services for which a contract has been concluded between an advertiser 400 and an advertising business (agency).

In other words, when an advertising system 100 is used, first, the advertiser 400 requests the advertising business to provide advertising text, including advertised information used as public information regarding the advertiser 400. Once a user who has read the advertising text dials the telephone line number (advertised telephone number) listed in the advertising text on a telephone (a first telephone) 300, it will be connected to the advertiser's telephone (a second telephone, which is not shown) that is managed by the advertiser 400. Thereafter, the advertising business will charge the advertiser 400 for contingency fees according to the status of connections.

This advertising system 100 includes a network 200, a user's telephone 300 connected to the network 200 and used by a user who is a connection request source, an advertiser's telephone connected to the network 200 and used by an advertiser 400 who is the connection request destination, a personal computer (not shown) connected to the network 200 and used by the advertiser 400, an advertising business server device 500 connected to the network 200 and managed by the advertising business; and a server system (call-accepting device) 600 connected to the network 200.

In this case, various telephones such as a household telephone 301, a public telephone, a mobile telephone 302, and PSH (Personal Handyphone System) can be used as a user's telephone 300.

The Internet or an intranet, LAN (Local Area Network), and the like, based on general-purpose network protocol such as TCP/IP (Transmission Control Protocol/Internet Protocol), can be applied to the network 200. A network such as a communication line network or a broadcast network that is configured with a plurality of base-stations able to send/receive information using wireless media 201, and the wireless media 201 itself, which becomes the media for directly sending/receiving the information via wireless communication, constitute possible examples. In this case, any media such as radio waves, light, acoustic waves, and electromagnetic waves can be applied to the wireless media 201.

Specifically, the network 200 is configured to have, for example, a Public Switched Telephone Network (PSTN) 210 and a Packet Switching Network (PSN) 220 such as the Internet.

Additionally, for example, ISDN (Integrated Services Digital Network) or the like can be applied to the public switched telephone network 210. This ISDN is capable of sending/receiving conversation number information regarding the telephone number of the connection request source and the connection request destination in addition to audio signals at the time of the conversation.

This public switched telephone network 210 is a network such as a base-station 212 for sending/receiving calls via a mobile telephone 302 by constructing a telephone line used by the mobile telephone 302, and a telecommunication base-station 213 for a telecommunication business operator who constructs various telephone lines connected so as to be capable of sending/receiving calls to each other between this base-station 212, a household telephone 301, a public telephone, and the like.

This public switched telephone network 210 is connected to the user telephone 300 and the advertiser's telephone so as to enable the conversation to be respectively held, and it is also connected to a server system 600.

The packet switching network 220 is connected to the mobile telephone 302 used by a user, a PDA (Personal Digital Assistant), a PC (personal computer) 310 used by a user, a PC installed at the location of the advertiser 400 and used by the advertiser (not shown), the advertising business server device 500; and the server system 600, so that various information can be sent/received. FIG. 1 shows that the packet switching network 220 is separated into a plurality of parts for the convenience of explanation.

For example, the Internet and other networks can be applied to the packet switching network 220. The Internet is a network that enables a user, for example, to access the advertising business server device 500 using a PC 310 and to browse Web pages that have been designed with HTML (Hypertext Markup Language) on the advertising business server device 500, using a Web browser in the PC 310.

Additionally, examples of other networks may include a network in which the advertising business server device 500 transmits various information in packets between the server system 600 and the personal computer of the advertiser 400, and in which the PC of the advertiser 400 transmits, via the server system 600, various information in packets.

This server system 600 is connected to the network 200 so as to have functions for connecting a call designating the advertised telephone number from a user's telephone 300 to the specific advertiser's telephone, outputting history information regarding calls and conversations between a user who has received information and the advertiser 400 according to requests from the advertising business server device 500; and generating information of charges according to the history information.

Additionally, this server system 600 is capable of outputting the call history and conversation history per advertising business, per advertised information, and per advertising period, according to requests from the advertiser 400 or the advertising business, so as to ascertain which advertising business, which advertised information, and which advertising period has produced the highest advertising effectiveness.

Figure 2:
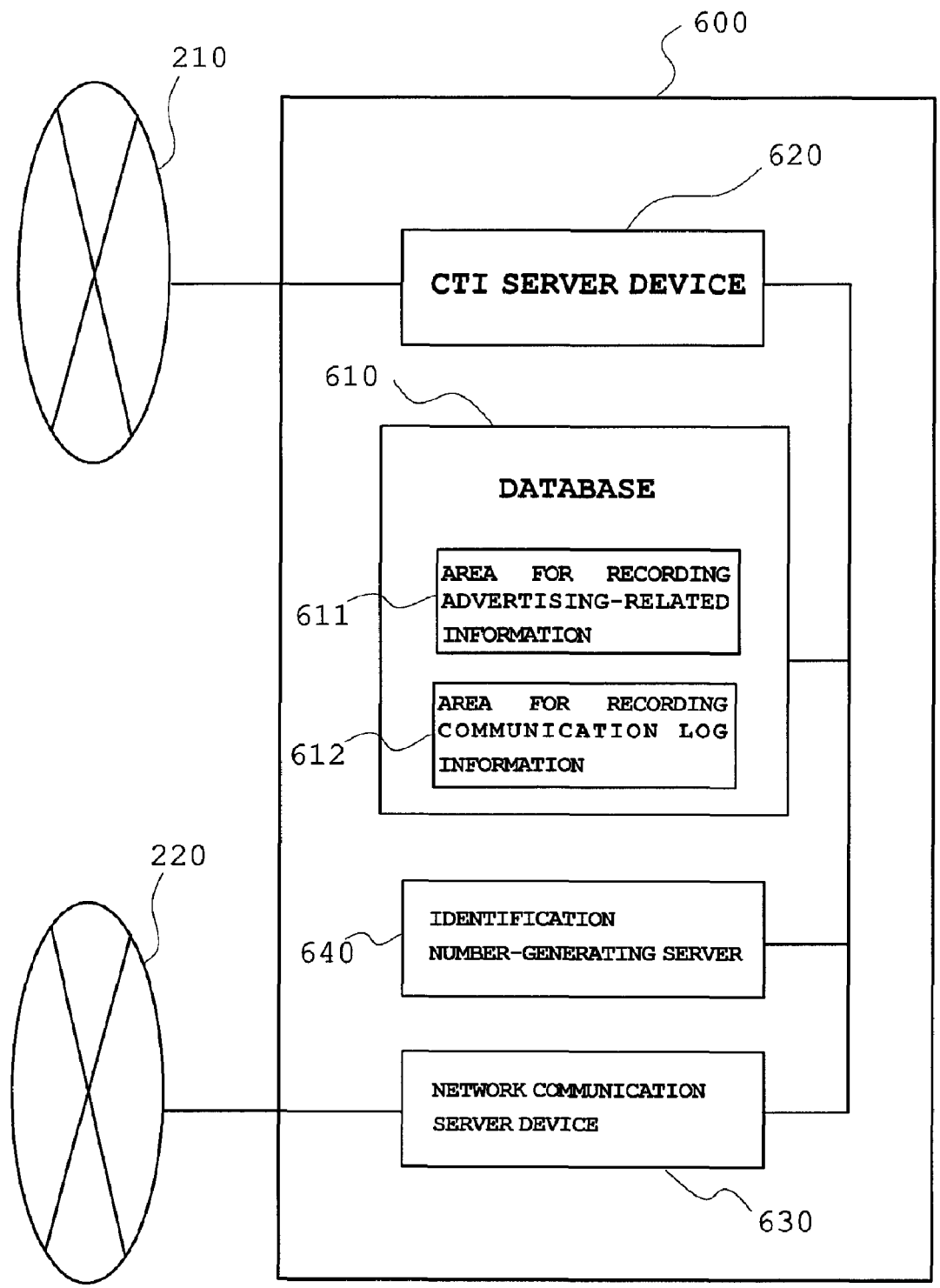
FIG. 2 is a block diagram showing a schematic internal configuration of the server system shown in FIG. 1.

As shown in FIG. 2, this server system 600 is configured to include, for example, a database (DB) 610, a CTI (Computer Telephony Integration) server device 620 used on a telephone line server line, a network communication server device 630, and an identification number-generating server 640 for automatically generating identification numbers, and to connect via an intranet, LAN (Local Area Network), or the like so that various information can be respectively sent/received.

The identification number is a number for identifying which advertised information has elicited calls made by users, and it is allocated for each set of advertised information. In a case in which calls from a plurality of sets of advertised information are collected, it is obvious that one identification number may be allocated with a plurality of sets of advertised information.

In the embodiments of the present invention, the server system 600 used as a call-accepting device is configured as comprising a plurality of databases 610 and devices 620, 630, and 640, but it is obvious that one server computer may include a plurality of databases 610 and all of the functions of the devices 620, 630, and 640.

The database 610 records various information necessary to connect calls in the server system 600 so that the CTI server device 620 and the network communication server device 630 can read them out. The identification numbers generated by the identification number-generating server 640 are also recorded in the database 610.

This database 610 is contained within the storage device. Examples of the storage device may be an HD (Hard Disk) or a recording drive or memory module that readably records on various recording media, or an integrated structure composed of a combination of a plurality of drives and memory modules.

The database 610 has an area for recording advertising-related information 611 and an area for recording communication log information 612. As shown in FIG. 3, the area for recording advertising-related information 611 records a plurality of sets of advertisement-identifying information 611A.

The advertisement-identifying information 611A has, as associated information, identification number information 611A1, advertiser information 611A2, advertising business information 611A3, advertising media information 611A4, advertising time information 611A5, business hours information 611A6, and line connection processing period information (not shown).

This identification number information 611A1 is automatically generated by the identification number-generating server 640 in response to a request from the advertising business server device 500 to the server system 600. It may also be configured to send an identification number that has been automatically generated by the identification number-generating server 640 in response to a request from the computer (not shown) of the advertiser 400 to the server system 600, to the advertising business server device 500 from the server system 600 or the advertiser 400.

The advertiser information 611A2 includes, for example, the store name information 611A2A and contact destination number information 611A2B of the advertiser 400. The contact destination number information 611A2B is information related to a telephone number (contact destination number) that has been allocated for the advertiser's telephone of the advertiser 400 or the line thereof.

The advertising business information 611A3 is information for identifying a plurality of advertising businesses, and the advertising media information 611A4 is information for identifying advertising media such as Web sites, magazines, newspapers, television, radio, and direct mail.

The advertising time information 611A5 is information for providing indications of the time or period during which the advertised information is provided. For example, it is configured to incorporate information 611A5A regarding the publishing-commencement date/time at which publishing commenced on the Web page, and information 611A5B about the publishing-termination date/time, at which the publishing is terminated, which are generally determined according to a contract between the advertising business and the advertiser 400.

Because this advertising time information 611A5 is associated with the advertisement-identifying information 611A, the commencement day for publishing the advertisement can be identified according to the identification number information 611A1. Thus, it can be ascertained which period has produced the highest effectiveness.

The server system 600 may be provided with an error-detecting unit (not shown) for judging a call as an error in a case in which a user's telephone 300 makes calls frequently within a short period or repeatedly makes calls at a specified time interval.

If an error is detected, the error will be reported via an error-reporting unit from the server system 600 to the advertising business server device 500, and thereafter, the advertising business may assign an identification number as a new number included in the advertised telephone number 710 (see FIG. 6) that is published in the advertised information. The advertising business may request the server system 600 to provide a new identification number so that the advertised telephone number 710 including the new identification number can be published as part of the advertised information.

Additionally, it is also possible to be configured so that once the advertising business server device 500 is alerted to an error, it automatically requests the server system 600 to give a new identification number and automatically publishes the advertised telephone number 710 including the new identification number within the advertised information on the Web page.

If this error-detecting unit is provided, an error can be easily handled by changing the advertised telephone number 710 published in the advertised information 700 (see FIG. 6) even in the case of prank calls. In other words, only prank calls can be effectively eliminated if it has been arranged for the server system 600 to reject connections to the old advertised telephone number 710 that has been incurred the prank calls, while connections to the new advertised telephone number 710 are approved.

The period for connecting to the telephone line by users who have received the advertised information 700 may be terminated according to the publishing-termination date/time information 611A5B within the advertising time information 611A5. Obviously, the line connection-processing period information may be separately added to the database 610 if the advertiser desires to be connected to the calls made by the users for a while after the termination of the advertising.

The business hours information (connectable time information) 611A6 is information for providing an indication of business hours of the advertiser 400. In other words, it is the time during which the advertiser 400 can respond to telephone calls. Accordingly, the server system 600 is configured to connect only calls made within the period range (a range of specific period) indicated by the business hours information 611A6, thus enabling unnecessary calls to be reduced, making it convenient for both the user and the advertiser. With respect to the business hours information 611A6, it can be exemplified that information regarding closed days displays flag information differentiating between business days and non-business days per day of the week, and information regarding the business hours is configured by managing numerical values representing the hours.

As shown in FIG. 4, the area for recording communication log information 612 is recorded with a plurality of sets of communication log information 612A regarding the conversation history for each conversation, whereby users have dialed the telephone number of the advertiser 400 according to the advertised information provided by the advertising business. Obviously, not only the conversation history but also the call history in which the calls have been connected but not completed with the conversation may be recorded in the area for recording the communication log information 612.

The communication log information 612A contains, as associated information, incoming call ID (identification) number information 612A1, caller number information 612A2, connection commencement time information (conversation commencement information) 612A3, connection termination time information (conversation termination information) 612A4, conversation time information 612A5, store name information 611A2A, advertising business information 611A3, and identification number information 611A1.

The incoming call ID number information 612A1 is information for an administration number, which is set every time a call is made to the advertised telephone number 710 by a user, and it has the function of an identification number for each communication history. This incoming call ID number information 612A1 will be explained in detail below, but it may be configured to output voice data to the user even in cases in which a connection for the conversation is not made between the user and the advertiser 400 outside business hours.

The caller number information 612A2 is information regarding a connection request source number that is the telephone number of a telephone line connected to a user's telephone 300. In addition to the telephone number information allocated for a user's telephone 300, information regarding the type of telephone (e.g., mobile telephone, public telephone, etc.) may be included. The connection commencement time 612A3 is information regarding the time when the call made by the user was connected to the advertiser 400. In other words, it is information regarding the time when the conversation between the user and the advertiser 400 commenced. Connection termination time information 612A4 is information regarding the time when a call that has been connected between a user and the advertiser 400 was disconnected. In other words, it is information regarding the time when the conversation between the user and the advertiser 400 was terminated.

Conversation time information 612A5 is information regarding the time of a conversation that was established between a user and the advertiser 400. This conversation time information 612A5 is information that, for example, is calculated by deducting the time of the connection commencement time 612A3 from the time of the connection termination time information 612A4.

The advertiser information 611A2 is information for identifying the advertiser 400 as a base who provides advertised information, as described above. The advertising business information 611A3 is also information for identifying the advertising business as an agency that provides advertised information as an agent, as described above. For example, information regarding the names of an advertiser 400 and advertising business, and the identification number that has been set by the administrator based on the advertiser 400 and advertising business, can be exemplified.

Additionally, in a case in which the advertiser 400 cannot respond to the incoming call from the user when it is outside business hours or is on another line and thus a voice response explaining "unconnectability" is given, flag information or the like (not shown) can be associated with the communication log information 612A to show that the advertiser 400 could not respond to the incoming call.

Figure 5:
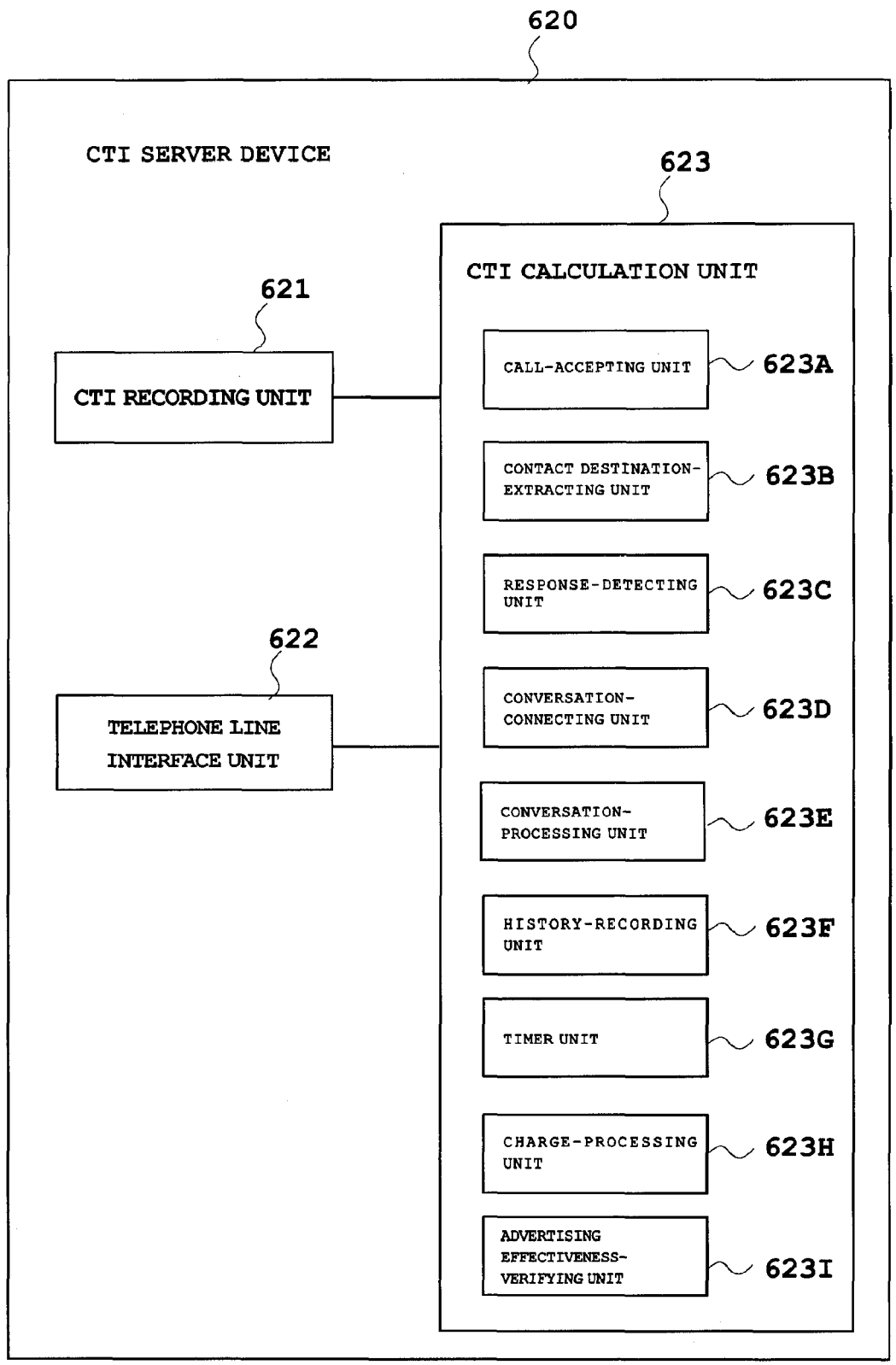
FIG. 5 is a block diagram showing a schematic internal configuration of the CTI server device shown in FIG. 2.

A CTI server device (call-accepting server) 620 is connected to the public switched telephone network 210 on the network 200. The CTI server device 620 is capable of connecting a user's telephone 300 to the advertiser's telephone via the public switched telephone network 210, and has a function as a so-called telephone switching machine for accepting calls. As shown in FIG. 5, this CTI server device 620 includes a CTI recording unit 621, a telephone line interface unit 622, and a CTI calculation unit 623.

The CTI recording unit 621 is connected to the CTI calculation unit 623, and accordingly, various information is recorded so that the CTI calculation unit 623 can read it out as needed. This CTI recording unit 621 can implement various configurations similar to that of the database 610. The CTI recording unit 621 sequentially records the communication log information 612A as communication history per call or conversation. The CTI recording unit 621 also records various programs that are developed on an OS (operating system) for controlling all operations of the CTI server device 620.

The telephone line interface unit 622 is connected to the CTI calculation unit 623, so telephone lines are connected and disconnected according to controls by the CTI calculation unit 623. The telephone line interface unit 622 also interfaces various information obtained from a user's telephone 300 and the advertiser's telephone to output them to the CTI calculation unit 623. Additionally, the telephone line interface unit 622 interfaces various information outputted from the CTI calculation unit 623 according to control by the CTI calculation unit 623 to output it to a user's telephone 300 and advertiser's telephone.

The CTI calculation unit 623 may, for example, include a CPU (Central Processing Unit) and thus performs various calculation processes related to the connection of telephone lines. The CTI calculation unit 623 includes a call-accepting unit 623A, a contact destination-extracting unit 623B, a response-detecting unit (part of a connection-processing unit) 623C, a conversation-connecting unit (part of a connection-processing unit) 623D, a conversation-processing unit 623E, a history-recording unit 623F, a timer unit 623G, a charge-processing unit 623H, an advertising effectiveness-verifying unit 623I for verifying the advertising effectiveness, and the like. Each of these functions is performed by the CPU according to operation orders made by a call-accepting program that will be described later.

Figure 6:
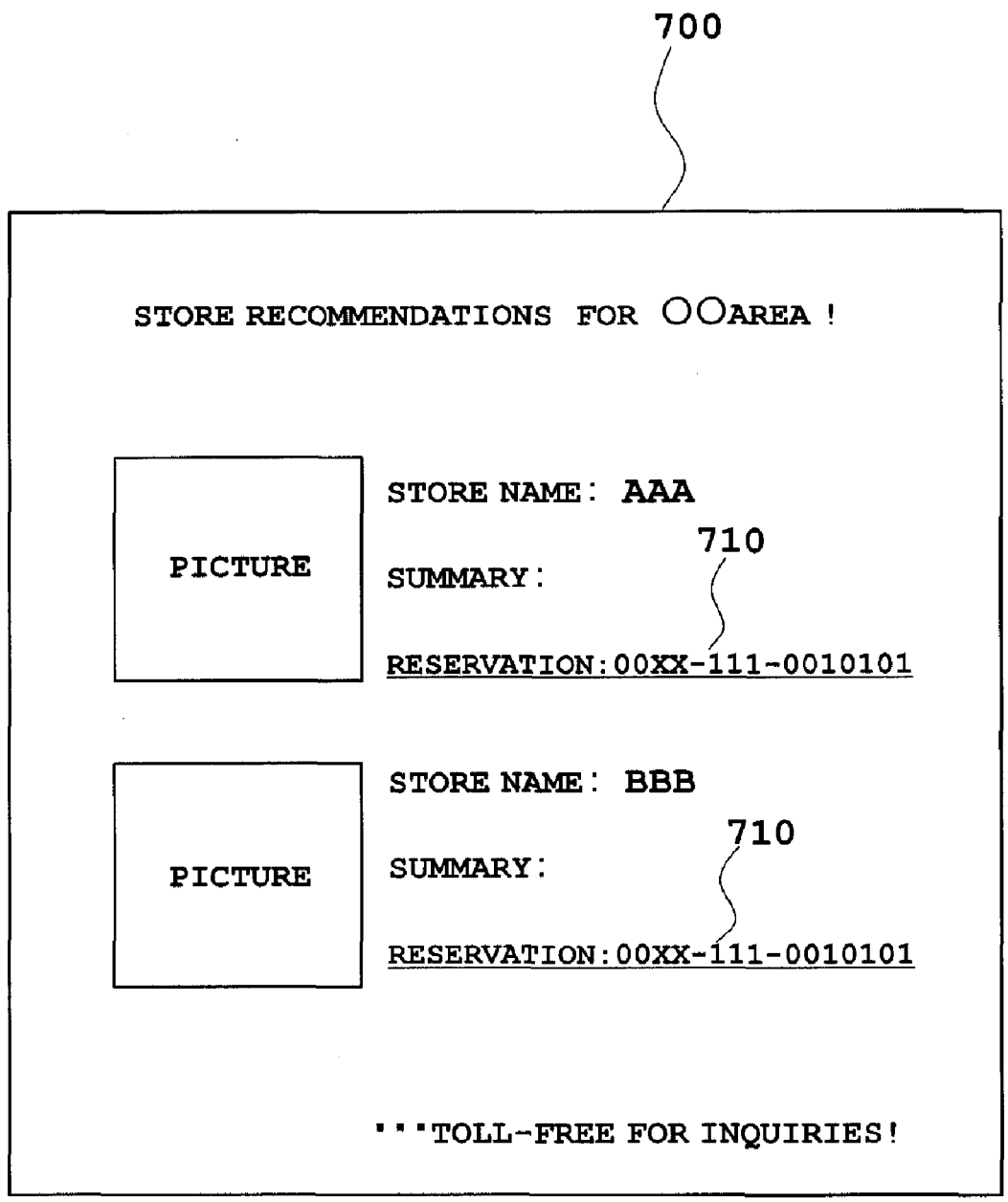
FIG. 6 is a drawing showing an example of advertised information provided by an advertising business.

The call-accepting unit 623A has a function for accepting calls designating the advertised telephone number 710 from a user's telephone 300. For example, once a user makes a call designating the advertised telephone number 710 listed in the advertised information 700 that has been published on a Web page or in a magazine as shown in FIG. 6, a call signal from that user telephone 300 is obtained by the telephone line interface unit 622. The call-accepting unit 623A obtains, via the telephone line interface unit 622, the telephone number of a user's telephone 300 (caller's telephone number) and the telephone number of the connection request destination for which a connection is requested, i.e., the advertised telephone number 710 that has been dialed.

However, under the condition in which the caller's telephone number and the advertised telephone number 710 are obtained, a user's telephone 300 and the CTI server device 620 are not in a situation in which a conversation can commence on the connecting lines, but in a situation in which call signals are transmitted as ringing. In other words, the CTI server device 620 has not yet responded to the incoming call at this time. Thereafter, the information obtained regarding the advertised telephone number 710 is output to the contact destination-extracting unit 623B and the history-recording unit 623F. Additionally, the call-accepting unit 623A obtains a call-accepting time from the timer unit 623G.

Figure 7:
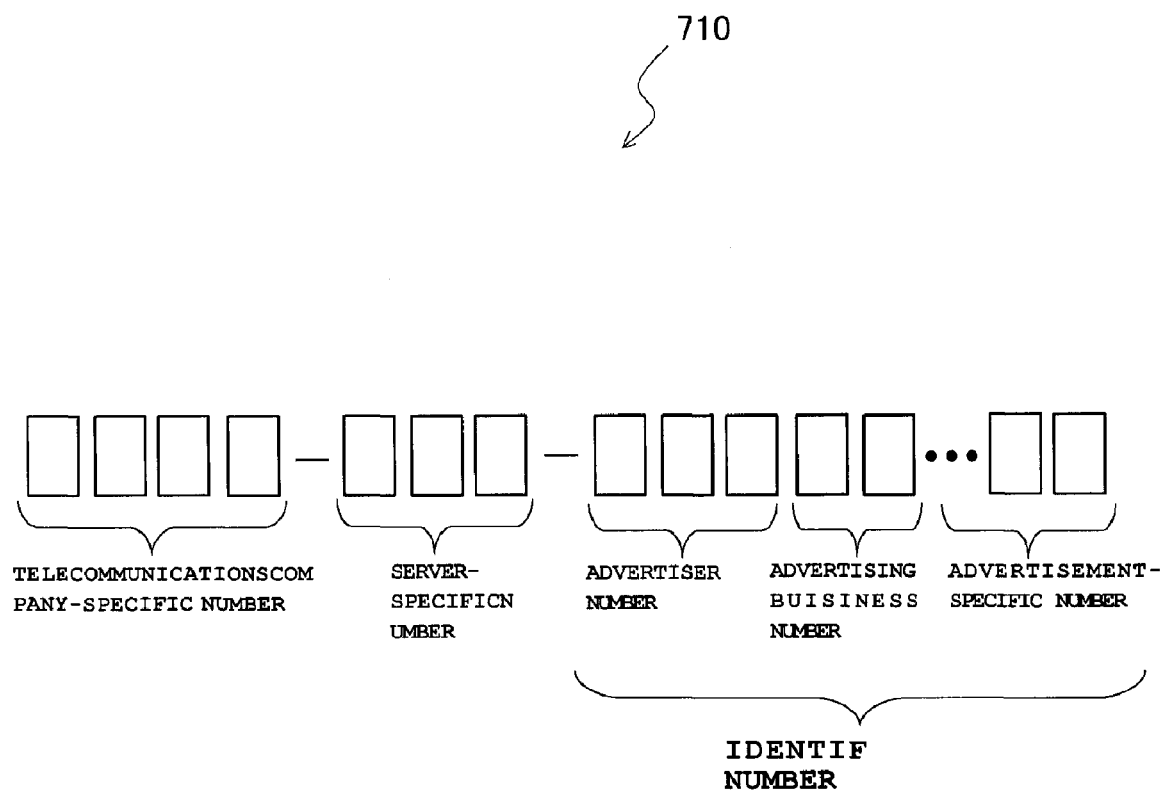
FIG. 7 is a structure diagram showing the internal structure of an advertised telephone number published in the advertised information shown in FIG. 6.

In this case, the advertised telephone number 710 that has been dialed via a user's telephone 300 may, for example, have a structure such as is shown in FIG. 7. This advertised telephone number 710 exemplified in FIG. 7 includes a number composed of 21 digits as a whole. Among these digits, the number comprising the first four digits is a specific number allocated to each telecommunications company. The telecommunications company refers to a business operator who manages telephone lines connecting a user's telephone 300, the advertiser's telephone, the server system 600, the public switched telephone network 210 for connecting these telephone lines, and the telecommunication base-station 213.

The three-digit number subsequent to the specific number of the telecommunications company is a specific number allocated for identifying the server system 600 and the CTI server 620, which is set by the telecommunications company.

The number comprising fourteen digits subsequent to the server-specific number is an identification number, which corresponds to the identification number information 611A1. The identification number is generated by the identification number-generating server 640 after the advertising business requests it from the server system 600. The identification number may include the advertising business number (agency number) allocated to each advertising business in order to identify the advertising business, as well as the advertisement-specific number allocated to each advertising information 700 in order to identify the advertising information 700. In addition, it may include advertiser number allocated to each advertiser in order to identify the advertiser.

This information enables calls designating the advertised telephone number 710 to be identified first by the telecommunications company, then to be identified by the server system 600 and the CTI server device 620, and thereafter to be accepted by the call-accepting unit 623A of the CTI server device 620. Subsequently, the contact destination information 611A2B associated with the identification number is specified by the database 610 according to the identification number information 611A1.

However, in the case in which it is not necessary to identify the advertising business, such as a case in which an advertising business has not been employed, the number for the advertising business can be omitted. Additionally, the information for identifying the advertising business can be included in the advertisement-specific number.

Additionally, it may be configured to publish the advertised telephone number 710 shown in FIG. 6 as a two-dimensional barcode such as a QR code (registered trademark) in the advertised information 700 and thereafter dial-up the advertised telephone number 710 by reading it with the mobile telephone 302 having a function for reading QR code. Obviously, the advertised telephone number 710 may be published in the advertised information 700 as a standard barcode (one-dimensional barcode) not as a two-dimensional barcode.

The contact destination-extracting unit 623B extracts the contact destination number that is a telephone number of the advertiser's telephone according to the advertised telephone number 710, after recognizing call signals in the call-accepting unit 623A.

Specifically, the contact destination-extracting unit 623B searches the advertisement-identifying information 611A corresponding to the advertiser 400 that is the connection request destination, from the area for recording the advertising-related information 611 of the database 610 according to the identification number included in advertised telephone number 710 that has been obtained by the call-accepting unit 623A, and thereafter obtains the contact destination number information 611A2B for this advertisement-identifying information 611A. This contact destination number information 611A2B is output to the response-detecting unit 623C.

The response-detecting unit 623C performs making a telephone call at a telephone number indicated by the contact destination number 611A2B that has been extracted by the contact destination-extracting unit 623B. Specifically, the response-detecting unit 623C dials-up a telephone number of the contact destination number and then outputs a call signal to a store's telephone via a telephone line of the contact destination number in the public switched telephone network 210.

With respect to this dial-up made to the advertised telephone, if the response-detecting unit 623C recognizes business hours information 611A6 of the advertisement-identifying information 611A for the advertiser 400 judges whether the advertiser 400 is within business hours and can respond to the call and judges that it is during the period when the connections can be made according to the current time obtained by the timer unit 623G, the dial-up will be performed.

When the store's telephone responds to the incoming call and the conversations can be made, the response-detecting unit 623C reports to the advertiser 400 that the user is making a call by outputting specific voice response data such as voice data "This is a call from a user who has browsed advertised information" that has been recorded in advance in the CTI recording unit 621, Thereafter, once the response-detecting unit 623C detects that the CTI server device 620 has been connected to the store's telephone machine, a signal for reporting that situation (connection completion signal) is output to the conversation-connecting unit 623D.

Once the CTI server device 620 is connected to the store's telephone, the conversation-connecting unit 623D performs a process for connecting the advertiser's telephone to a user's telephone 300. In other words, once a detection signal indicating that the CTI server device 620 and the advertiser's telephone are connected, is received from the response-detecting unit 623C, a user's telephone 300 under the calling-out states is responded and thereafter connected to the advertised telephone. Additionally, the conversation-connecting unit 623D obtains a time when a user's telephone 300 is connected to the advertiser's telephone (conversation commencement time) according to the current time measured by the timer unit 623G.

The conversation-processing unit 623E has a function for transmitting, to the other, conversation voice information for one of a user's telephone 300 and the advertiser's telephone, which have been connected by the conversation-connecting unit 623D. In other words, a voice signal is extracted from a telephone line connected to one of a user's telephone 300 and the advertiser's telephone. Thereafter, the extracted voice signal is transmitted to a telephone line connected to the other one of a user's telephone 300 and the advertiser's telephone.

The voice signal transmission performed by this conversation-processing unit 623E enables a conversation to be established between the user and the advertiser. During the time of this conversation, the CTI server device 620 is positioned between the telephone line connected to a user's telephone 300 and the telephone line connected to the advertiser's telephone, and thereby maintaining both telephone lines connected.

The history-recording unit 623F detects the conditions of transmitting the voice signal made by the conversation-processing unit 623E, in other words, the conditions where the CTI server device 620 connects the telephone line connected with a user's telephone 300 and the telephone line connected with the advertiser's telephone, generates the communication log information 612A for a history of the communications that are under the line connection conditions (i.e., a conversation history), and thereafter record it.

This communication-log information 612A is temporarily recorded to the CTI recording unit 621 and is output to the database 610 accordingly to be recorded in the area for recording communication log 612. More specifically, once the history-recording unit 623F receives from the call-accepting unit 623A a signal indicating that a call has been accepted (e.g., the information of the advertised telephone number 710 related to the call), it will set an incoming call ID number for generating the communication log between the user and the advertiser 400, generate the incoming call ID number information 612A1, and record that incoming call ID number information 621A1 in the CTI recording unit 621.

The history-recording unit 623F generates the caller number information 612A2 according to the telephone number of a user's telephone 300 (caller's telephone number) that has been obtained in the call-accepting unit 623A, and associates it with the incoming call ID number information 612A1.

The history-recording unit 623F receives the connection commencement time obtained in the conversation-connecting unit 623D, as a time when the transmission of the voice signal in the conversation-processing 623E is commenced, in other words, a time when a connection of the telephone line between the user and the advertiser 400 is commenced to start the conversation therebetween. Subsequently, it generates the connection commencement time information 612A3 and associates it with a corresponding incoming call ID number information 612A1.

The history-recording unit 623F receives the connection termination time obtained in the conversation-connecting unit 623D, as a time when the transmission of the voice signal in the conversation-processing 623E is terminated, in other words, a time when a connection of the telephone line between the user and the advertiser 400 is disconnected to terminate the conversation therebetween. Subsequently, it generates the connection termination time information 612A4 and associates it with a corresponding incoming call ID number information 612A1.

The history-recording unit 623F calculates the conversation time between the user and the advertiser 400 according to the connection commencement time and the connection termination time, generates the conversation time information 612A5, and associates it with a corresponding incoming call ID number information 612A1.

The history-recording unit 623F extracts, from the area for recording advertising-related information 611 within the database 610, the store name information 611A2A of the advertiser 400 and the advertising business information 611A3, which have been associated with the identification number, according to the identification number obtained in the call-accepting unit 623A, and associates it to a corresponding incoming call ID number information 612A1.

The history-recording unit 623F associates, with a corresponding incoming call ID number information 612A1, the contact destination number information 611A2B that has been extracted in the contact destination-extracting unit 623B. Then, after generating the communication log information 612A and temporarily recording it in the CTI recording unit 621, it is collectively output to the database 610 after the specific period to be sequentially recorded in the area for the communication log information area 612.

Additionally, the timer unit 623G recognizes a current time according to a reference pulse such as an internal clock. Thereafter, this timer unit 623G outputs time information regarding the recognized current time information accordingly.

The charge-processing unit 623H performs a process of generating information of charges in response to a process of outputting, to the advertising business, the communication log information 612A related to that advertising business in the condition where the disclosure can be made.

As this output of the communication log information 612A to the advertising business under the conditions where the disclosure can be made, for example, it can be exemplified that the communication log information 612A related to the advertising business is transmitted as electronic data from the network communication server device 630 via the packet switching network 220, and that the communication log information 612A related to the advertising business is printed out to recording papers, the details of which will be described later.

As a process of generating the information of charges, a calculating process of a part of telephone line usage fees for a user's telephone 300 side, telephone line usage fees for the advertiser's telephone side, necessary expenses for a connecting process for both telephones, and a part of advertising fees, etc., according to the communication log information 612A, can be exemplified.

A process of charging the calculated information of charges (charged amount) to the advertising business, may be performed. For example, a settlement process may be performed by the network communication server devise 630 after a Firm Banking (FB) that has been constructed in a so-called financial VAN as a Value-Added Network (VAN) 800 (shown in FIG. 1) managed by each financial institution, is connected to the packet switching network 220. A display for urging the settlement process to an administrator of the server system 600 may be performed in the server system 600.

Moreover, the advertising effectiveness-verifying unit 623I performs a process of outputting the communication log information 612A related to the advertiser 400 or the advertising business in the condition where the disclosure can be made, in response to a request made by the advertiser 400 or the advertising business.

As this output of the communication log information 612A in the conditions where the disclosure can be made, items that have been explained for the abovementioned charge-processing unit 623H can be exemplified, but other than that, it is also possible to be configured to browse the information on a PC of the advertiser 400 that has accessed to the server system 600 and the advertising business server device 500.

Figure 8:
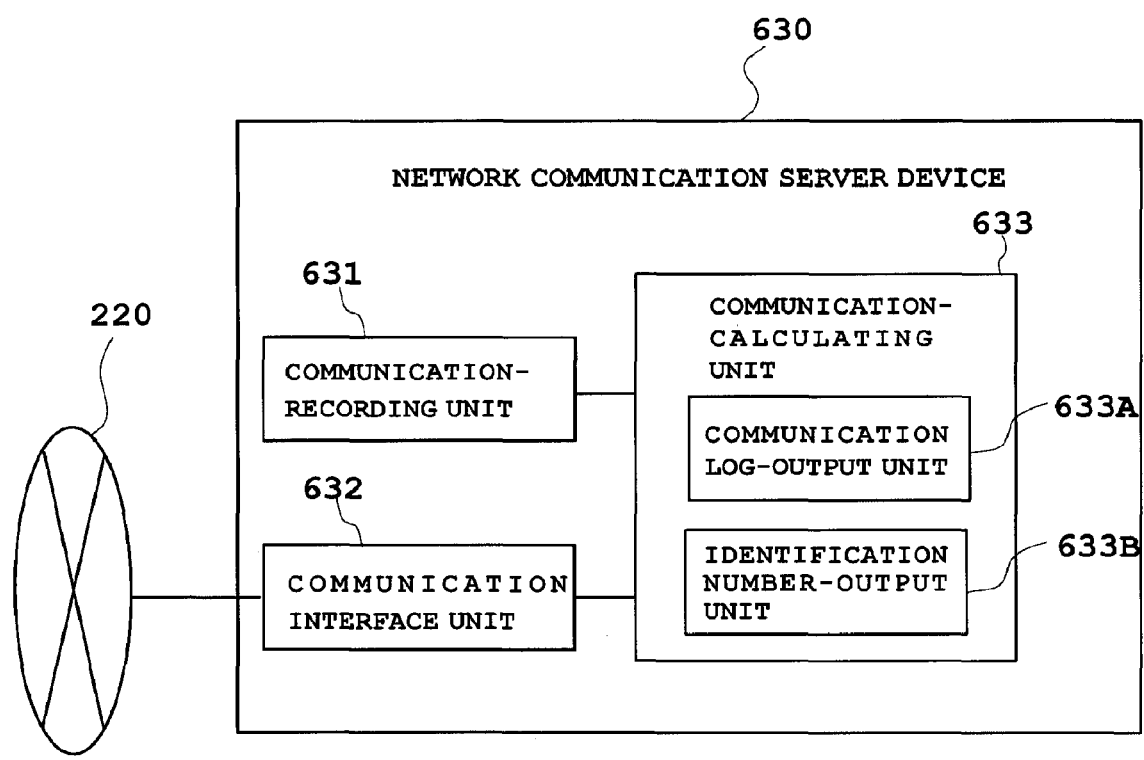
FIG. 8 is a block diagram showing a schematic internal configuration of the network communication server shown in FIG. 2.

The network communication device 630 is connected to the packet switching network 220 so that various information can be sent to/received from the advertising business server device 500 and the PC of the advertiser 400. This network communication device 630 is configured to include, for example, a communication-recording unit 631, a communication interface unit 632, and a communication-calculating unit 633, as shown in FIG. 8.

The communication-recording unit 631 is connected to the communication-calculating unit 633, and thus, various information is recorded so that the communication-calculating unit 633 can read them out accordingly. This communication-recording unit 631 can apply various configurations similar to that of the CTI recording unit 621 in the CTI server device 620.

The communication-recording unit 631 also records various programs, which developed on an OS for controlling the entire operations of the network communication server 630. The communication-recording unit 631 also records a communication log-outputting program for allowing the communication-calculating unit 633 to function as a communication log-outputting unit (history-outputting unit) 633A.

The communication interface unit 632 is connected to the communication-calculating unit 633, and thus, information is sent/received via the packet-switching network 220 according to the controls of the communication-calculating unit 633. In other words, the communication interface unit 632 interfaces various information such as a browse-requesting signal and a transmission-requesting signal of the communication log, which is obtained from the advertising business server device 500, the PC of the advertiser 400, and the financial VAN, etc., via the packet switching network 220, according to the controls of the communication-calculating unit 633, and thereafter outputs it to the communication-calculating unit 633.

The communication interface unit 632 also interfaces various information outputted from the communication-calculating unit 633, such as communication log information 612A, identification number information 611A1, charge details information, and advertising effectiveness-verifying information according to the controls of the communication-calculating unit 633 to output it to the advertising business server device 500, the PC of the advertiser 400, and the financial VAN.

This communication-calculating unit 633 includes, for example, a CPU, and thus, a function of processing calculations of various information. The communication-calculating unit 633 performs a function as the communication log-outputting unit (history-outputting unit) 633A according to operation orders made by a communication log-outputting program. The communication-calculating unit 633 also functions as an identification number-outputting unit 633B for outputting the identification number generated by the identification number-generating server 640 to the communication interface unit 632.

After receiving a signal such as a browsing request of the communication log and a transmitting request of the communication log information 612A via the packet switching network 220, for example, from the advertising business server device 500 and the PC of the advertiser 400, this communication log-outputting unit 633A has a function that the communication log information 612A about a corresponding advertising business and advertiser 400 is, for example, emailed or put on the Web page so as to be browsed.

Specifically, once the communication log-outputting request signal is obtained from the communication interface unit 632, the communication log-outputting 633A will identify the adverting business or the advertiser 400 according to the information regarding the advertising business or the advertiser 400, which has been recorded in the database 610. Thereafter the communication log information 612A about that advertising business or advertiser 400 is extracted from the database 610.

In other words, the communication log information 612A including the advertising business information 611A3 of the advertising businesses, or the communication log information 612A including the store name information 611A2A of the advertiser 400, are extracted. Thereafter, it is sent to the advertising business server device 500 and the PC of the advertiser 400, or performed with a process of publishing on a Web page so that it can be browsed on the advertising business server device 500 and the computer of the advertiser 400.

Additionally, once the identification number-outputting unit 633B recognizes a signal requesting to provide the identification number, for example, from the advertising business server device 500 and the PC of the advertiser 400 via the packet switching network 220, it generates the identification number in the identification number-generating server 640, and the generated identification number is, for example, sent by email or performed with a process of allowing it to be browsed on a Web page.

Specifically, once a signal requesting for providing the identification number is obtained from the communication interface unit 632, the identification number-outputting unit 633B will be connected to the identification number-generating server 640 to allow it to generate the identification number by inputting the necessary information in the specific form.

Thereafter, the identification number-outputting unit 633B sends the identification number to the advertising business and the computer of the advertiser 400, who have requested to provide the identification number, or performs a process of publishing the identification number on a Web page so as to be browsed in the advertising business server device 500 and the PC of the advertiser 400.

Operations of an advertising system comprising a server system 600 according to an embodiment of the present invention will be described below with reference to the drawings.

In this embodiment, a case in which one call is accepted will be explained, but it is obvious that this server system 600 is capable of accepting calls from a plurality of user's telephones 300 approximately at the same time. Additionally, a configuration of using the function of a toll-free conversation for a caller will be exemplified, but it is not limited to this configuration, and it may be a configured so that the caller side will cover the conversation fees.

[In a Case in which an Advertiser 400 Responds to an Incoming Call]

Figure 9:
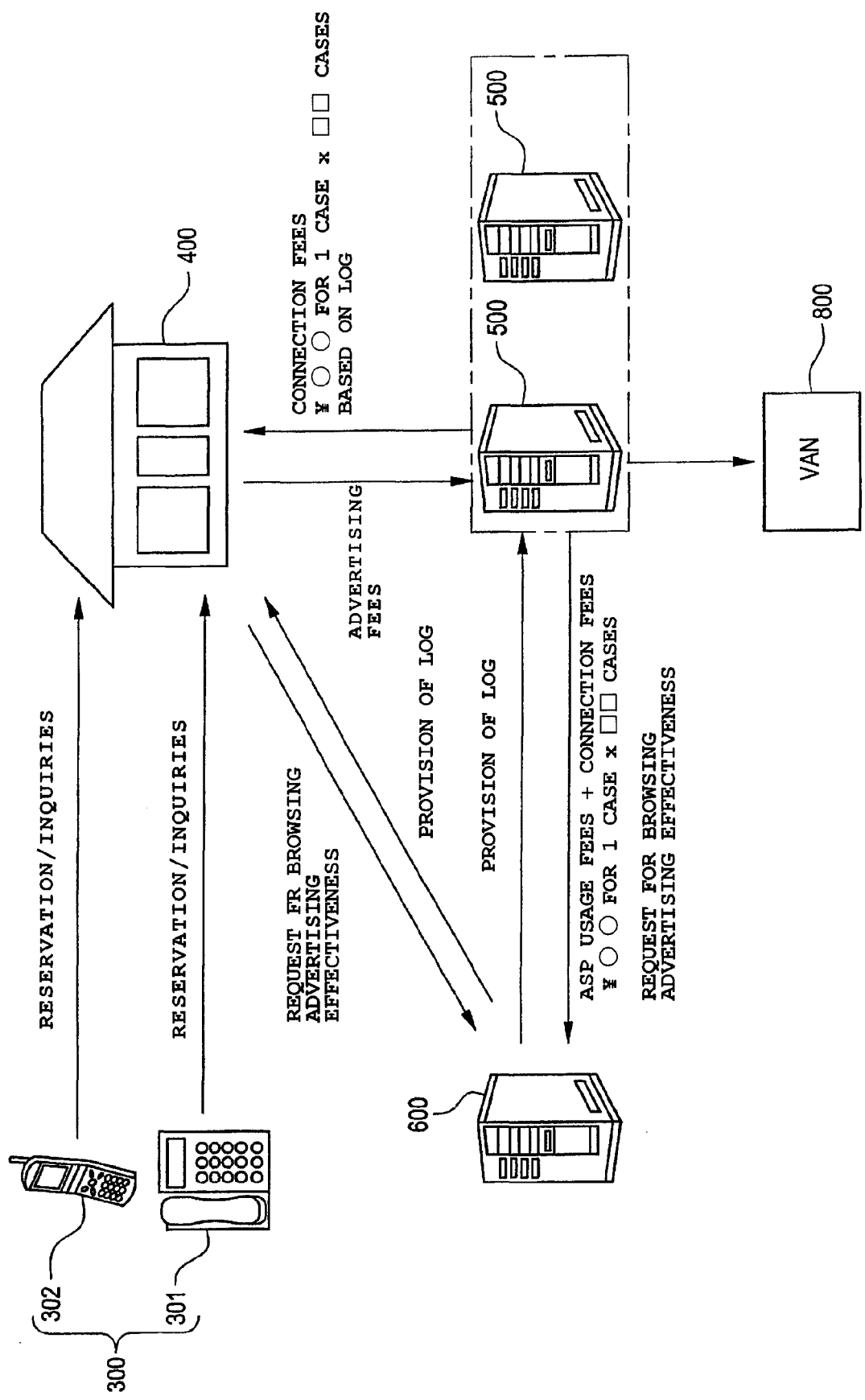
FIG. 9 is an explanatory diagram conceptually showing the relationship of a user, an advertiser, an advertising business, and an administrator of a server system who use the advertising system shown in FIG. 1.
Figure 10:
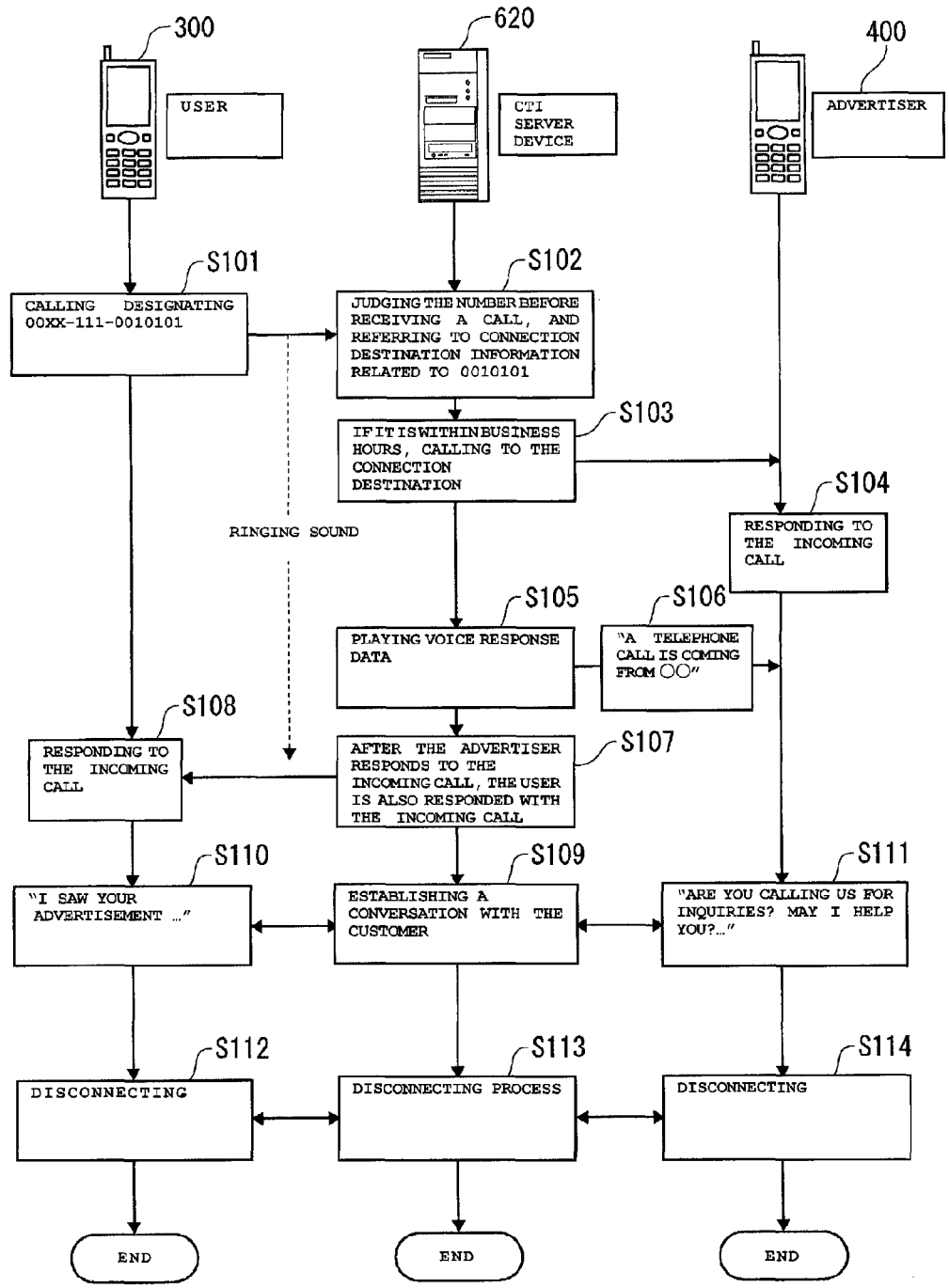
FIG. 10 shows the operation of the advertising system shown in FIG. 1, which is a flow chart for explaining a processing operation in which a call made from a user is connected to the telephone of an advertiser and which is a drawing for explaining a case in which the advertiser responds to an incoming call.

FIG. 9 is an explanatory diagram conceptually showing a relationship of a user's telephone 300, an advertiser 400, an advertising business server device 500, and a server system 600. FIG. 10 is a flow chart for explaining a processing operation in which a call made from the user is connected to a telephone of the advertiser 400. In this FIG. 10, a case in which the advertiser 400 responds to an incoming call is described.

When a user, who has received advertised information 700 shown in FIG. 6, makes a call in order to make reservations and inquiries, etc. to an advertiser 400, an advertised telephone number 710 listed in the advertised information 700 is dialed by a user's telephone 300. This dial operation allows a call signal to be output from a user's telephone 300 (Step S101).

The output of the call signal from a user's telephone 300 allows the call to be connected to a telecommunication base-station 213 of a telecommunications company corresponding to a telecommunications company-specific number within the advertised telephone number 710, and additionally to be connected to a CTI server device 620 of the server system 600 corresponding to a server-specific number.

Thereafter, once the call signal is output to the CTI server device 620 from a user's telephone 300 through a dialing step in this Step S101, the CTI server device 620 will obtain the call signal made from a user's telephone 300, in a call-accepting unit 623A of a CTI calculation unit 623 through a telephone line interface unit 622, without making any incoming call response to a user's telephone 300. Additionally, the call-accepting unit 623A obtains a caller's telephone number of a user's telephone 300 and the advertised telephone number 710 from the telephone interface unit 622.

After recognizing that the call-accepting unit 623A has obtained the call signal, a history-recording unit 623F sets an incoming call ID number to generate an incoming call ID number information 612A1. Additionally, the history-recording unit 623F recognizes the callers telephone number of a user's telephone 300, which has been obtained in the call-accepting unit 623A, to generate caller's number information 612A2, and associates it with the incoming call ID number information 612A1. Thereafter, a contact destination-extracting unit 623B makes a process of extracting a telephone number (contact destination number) of the advertiser's telephone (Step S102).

In other words, the CTI calculation unit 623 recognizes an identification number included in the advertised telephone number 710 that has been obtained in the call-accepting unit 623A, searches advertisement-identifying information 611A for the advertiser 400, which has been associated with the identification number, from the area for recording the advertising-related information 611 within the database 610, obtains the contact destination number information 611A2B of the advertisement-identifying information 611A, and outputs it to a response-detecting unit 623C.

Additionally, the history-recording unit 623F associates, with the incoming call ID number information 612A1, the contact destination number information 611A2B that has been obtained in the contact destination-extracting unit 623B.

Once the contact destination-extracting unit 623B extracts the contact destination number in the Step S102, the response-detecting unit 623C will recognize business hours information 611A6 of the advertisement-identifying information 611A for the advertiser 400, and judge whether or not that advertiser 400 can response to an incoming call.

Thereafter, if it is judged according to a current time measured by a timer unit 623G that it is within a period when the advertiser can respond to the incoming call, the contact destination number will be dialed-up (Step S103).

According to a dial-up in this Step S103, once the advertiser's telephone responses to the incoming call according to the call signal that is output from the CTI server device 620 (Step S104), the response-detecting unit 623C will output, to a store's telephone, voice response data within a CTI recording unit 621, such as voice data of "This is a call from a user who has browsed advertised information." (Step S105).

Once the voice data is played in the Step S105 (Step S106), the advertiser 400 will be reported that the call has been made from the user, and the user will wait for a response.

Once the conversation-connecting unit 623D obtains a connection completion signal that is output from the response-detecting unit 623C and recognizes that the CTI server device 620 and the advertiser's telephone have been connected, it will response to the incoming call of a user's telephone 300 that is under the calling-out states, and connect a user's telephone 300 and the advertiser's telephone (Step S107).

Subsequent to a process made by this Step S107, once the connection between a user's telephone 300 and the advertiser's telephone have been recognized (Step S108), the conversation-processing unit 623E will extract and transmit voice signals respectively from a user's telephone 300 and the advertiser's telephone, which have been connected, to establish the conversation between the user and the advertiser 400 (Step S109).

For example, if the conversation-processing unit 623E obtains a voice signal according to the user's statement of "I saw your advertisement . . . " from the user telephone 300 (Step 110), that voice signal will be transmitted and played to the advertiser's telephone.

Additionally, for example, if the conversation-processing unit 623E obtains a voice signal based on the advertiser 400's statement of "Are you calling us for inquiries? May I help you? . . . " (Step S111), that voice signal will be transmitted and played to a user's telephone 300.

According to processes of Step S109-Step S111, the history-recording unit 623F recognizes a time when a user's telephone 300 and the advertiser's telephone are connected, as a current time measured by the timer unit 623G, generates connection commencement time information 612A3, and associates it with the incoming call ID number information 612A1. The conversation-processing unit 623E continues these processes of Step S109 to Step S111 while a user's telephone 300 and the store telephone of the advertiser 400 are connected.

Moreover, while a user's telephone 300 and the telephone of the advertiser are connected, the history-recording unit 623F monitors the connection conditions for both telephones and judges whether or not the conversation-connecting unit 623D has performed a disconnection of the connection.

Thereafter, for example, if the user performs an operation of terminating the conversation (Step S112), the connection of the telephone line for the side of a user's telephone 300 will be disconnected.

Once the CTI calculation unit 623 recognizes that the telephone line of a user's telephone 300 has been disconnected, the telephone line for the advertiser's telephone that has been connected, will be disconnected (Step S113). According to this disconnecting step of Step S113, the advertiser 400 recognizes that the conversation has been terminated. Thereafter, the telephone is hung up under the condition where the advertiser's telephone is off-hook (Step S114). Then, the CTI calculation unit 623 that has recognized these disconnections, terminates the disconnecting process, and the line connection is terminated.

Once it is recognized that one of telephone lines of a user's telephone 300 side or the advertiser's telephone side has been first disconnected in this Step S112 or Step S113, the history-recording unit 623F will obtain a current time from the timer unit 623G and generate connection termination time information 612A4 by processing this current time as a connection termination time. Thereafter, the history-recording unit 623F associates it with the incoming call ID number information 612A1 to generate communication log information 612A and temporarily records it in the CTI recording unit 621.

The communication log information 6121A that has been temporarily recorded is collectively output to the database 610 after the specific period to be sequentially recorded in the area for the communication log information area 612.

[In a Case in which an Advertiser 400 does not Respond to an Incoming Call]

A case in which an advertiser 400 does not respond to an incoming call will be described below.

Figure 11:
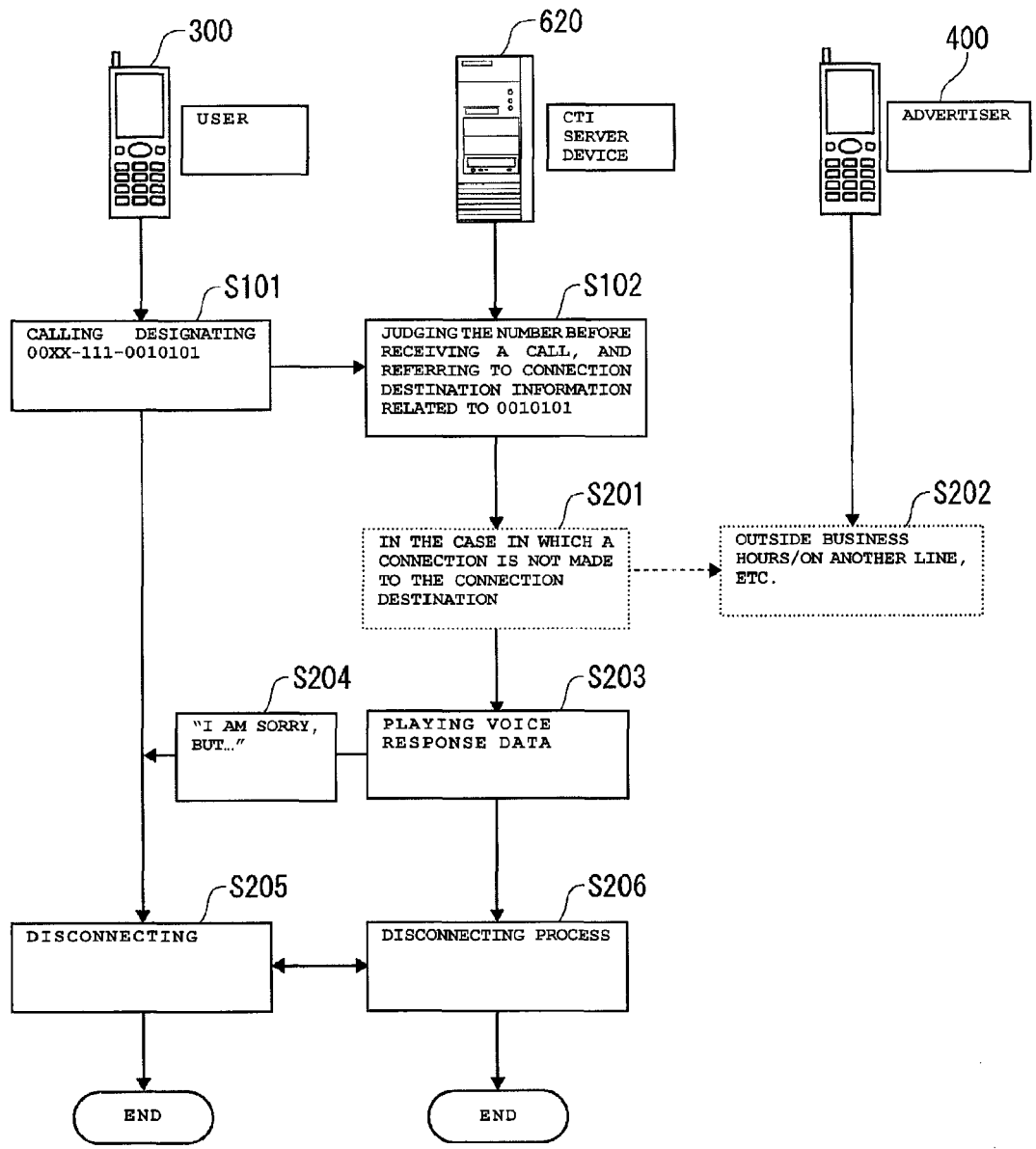
FIG. 11 shows the operation of the advertising system shown in FIG. 1, which is a flow chart for explaining a processing operation in which a call made from a user is connected to the telephone of an advertiser and which is a drawing for explaining a case in which the advertiser does not respond to an incoming call.

FIG. 11 is a flow chart for explaining a processing operation in which a call made from the user is connected to a telephone of the advertiser 400. In this FIG. 11, a case in which the advertiser 400 does not respond to an incoming call will be described.

Similar to the case of a processing operation shown in FIG. 9 and FIG. 10, the user dials-up the advertised telephone number 710 of the advertised information 700 in Step S101, and thereby the contact destination number information 611A2B is obtained in Step S102.

Thereafter, the response-detecting unit 623C recognizes the business hours information 611A6 of the advertisement-identifying information 611A for the advertiser 400, and judges whether or not that advertiser 400 can respond to an incoming call (Step S201). For example, it judges whether or not it is within a connectable time according to the business hours information 611A6, or whether or not the advertiser 400 has responded to the output of the call signal by actually dialing-up the contact destination number, as shown in FIG. 11 (Step S202).

In a process of this Step S201, if it is judged that the telephone line cannot be connected, the conversation-connecting unit 623D allows the CTI server device 620 to respond to the incoming call of a user's telephone 300 that is under the calling-out states.

For example, cases for judging as unconnectable can be exemplified with a case in which it is judged that it is outside the connectable time according to the business hours information 611A6 of the advertisement-identifying information 611A, a case in which it is judged that the advertiser's telephone is on another line and thus cannot be connected, or a case in which it is judged that an incoming call response has not been made even after calling the advertiser's telephone over a specific period.

Thereafter, the conversation-processing unit 623E reads the specific voice response data, for example, within the CTI recording unit 621, such as voice data of "I'm sorry, but our business has been closed today . . . " or "I'm sorry, but we are on another line . . . " and thereafter outputs it to a user's telephone 300 (Step S203).

Additionally, the history-recording unit 623F recognizes a time when a user's telephone 300 is connected to the CTI server device 620, as a current time measured by the timer unit 623G, and generates the connection commencement time information 612A3. Then, it is associated with the incoming call ID number information 612A1. Moreover, the history-recording unit 623F sets and records non-response flag information indicating that the advertiser 400 has not responded to the incoming call in the communication log information 612A.

Once the voice response data is played for the side of a user's telephone 300 in the Step S203 (Step S204), the user will be reported that the advertiser 400 cannot be connected. Once the user performs a process of hanging up the telephone according to this played voice response data (Step S205), the telephone line for the side of a user's telephone 300 will be disconnected.

Once the CTI calculation unit 623 recognizes that the telephone line of a user's telephone 300 has been disconnected, the CTI server device 620 will also perform a process of disconnecting the telephone line of itself. Once the history-recording unit 623F recognizes that disconnection, it will recognize a current time measured by the timer unit 623G, as a connection termination time of the telephone line, generate the connection termination time information 612A4, associate it with the incoming call ID number information 612A1, and generate and record the communication log information 612A.

A settlement process between an advertiser 400, an advertising business, and a server system 600 will be described below.

A regular and automatic charging configuration will be described herein, but the charging method and settling method are not limited to processing operations that will be described below, so it may be manually operated.

In a case in which information regarding a charging date for an advertising business is preliminarily recorded in a database 610, a charge-processing unit 623H of the CTI server device 620 extracts communication log information 612A having advertising business information 6111A3 for that advertising business, from the area for recording communication log information 612 in the database 610.

Thereafter, the charge-processing unit 623H calculates total communication fees by calculating telephone line usage fees according to conversation time information 612A5 of the extracted communication log information 612A. The charge-processing unit 623H also counts the number of the communication log information 612A, and multiplies, by the specific fees, the number of the communication log information, that is, the number of implementations of connecting processes for the telephone line in order to calculate total usage fees. The charge-processing unit 623H performs a charging process to the advertising business intended for the charge, in the charged amount of total amount obtained by adding the total communication fees and total usage fees.

It is obvious that the charged amount can be set according to various contracts, such that the charged amount is added with basic fees or the amount is fixed.

As a charging process, for example, it can be exemplified that a list for the extracted communication log information 612A and details of the charged amount are emailed to an advertising business server device 500 of the target advertising business, and a list of the communication log information 612A and details of the charged amount are printed out to printing papers.

Additionally, the charge-processing unit 623H may perform a process of allowing a network communication server device 630 to perform a settlement process using a FB constructed in a financial VAN 800.

Subsequently, after the settlement process is performed by the server system 600, the advertising business, for example, connects to the server system 600 from the advertising business server device 500, and inputs necessary information according to the specific form. Thereafter, a communication log-outputting unit 633A of the network communication server devise 630 outputs the communication log information 612A via the packet switching network 220 so that the communication log information 612A can be browsed by the advertising business server device 500.

Additionally, the advertising business calculates the charged amount according to the contents of the contract made with the advertiser 400, according to the communication log information 612A obtained from the administrator of the server system 600, and thereafter performs a charging process to the advertiser 400. As this charging process, various charging methods can be applied to the above, such as a method for mailing a bill and a method for using the financial VAN 800. It is obvious that the calculation of the charged amount is appropriately set depending on the contract, such as a fixed amount and a metered rate according to the number of connections.

A method for verifying advertisement effectiveness produced by the advertiser 400 or the advertising business will be described below.

As described above, this advertising system 100 is configured to identify advertisers 400, advertising businesses, advertising media with which advertised information has been provided, and advertisement-publishing date/time, etc., according to identification numbers generated automatically by the identification number-generating server 640.

The communication log information 612A recorded in the area for recording communication log information 612 in the database 610, records identification number information 611A1 as advertisement-identifying information 611A, and therefore it can be ascertained which advertised information is based for the conversation that has generated the communication log information 612A.

Figure 12:
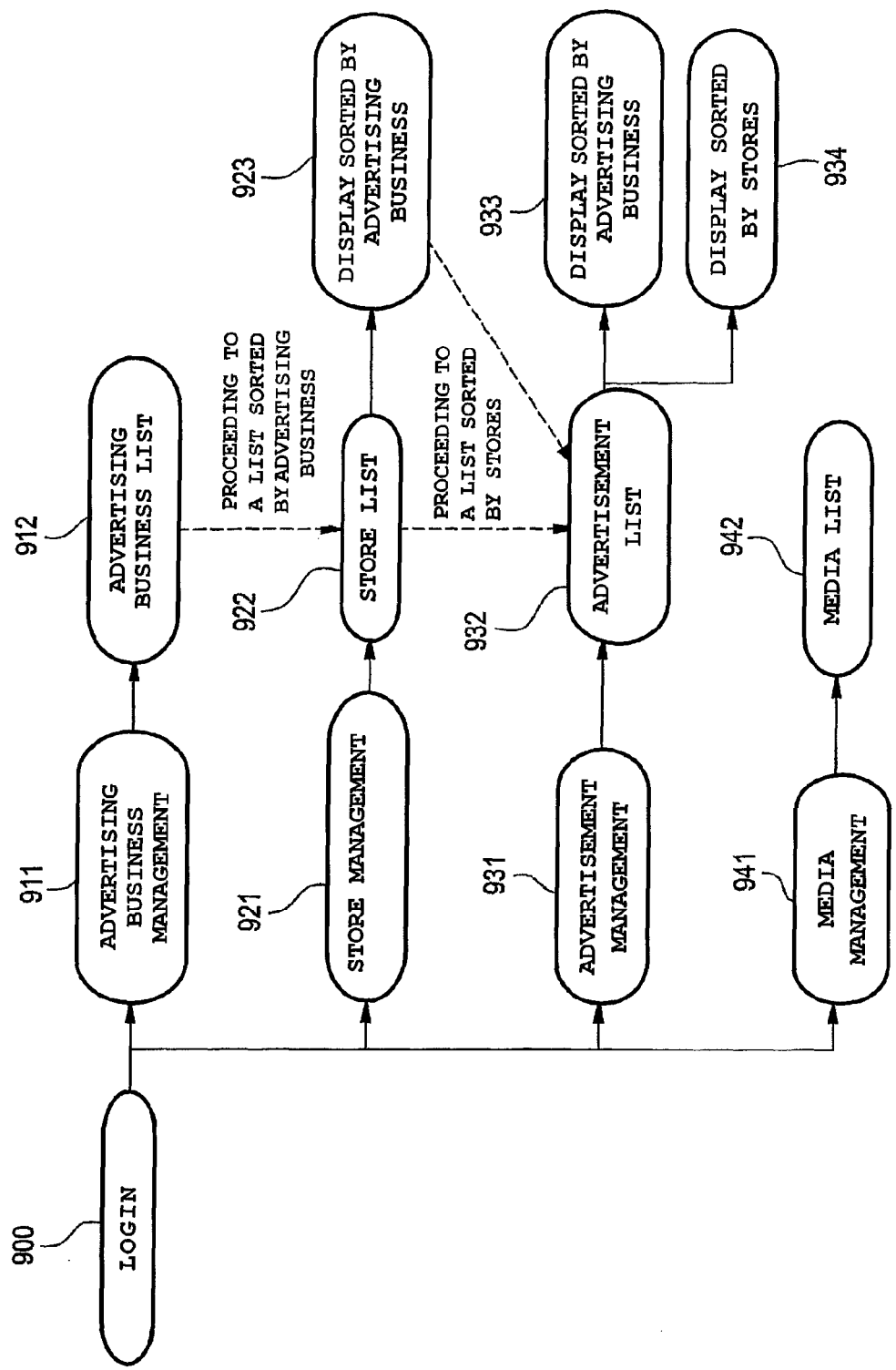
FIG. 12 shows the hierarchic structure of a screen display, which is performed with a display process by the advertising effectiveness-verifying unit shown in FIG. 5.

FIG. 12 shows a hierarchy for a screen display, which is performed with a display process by an advertising effectiveness-verifying unit 623I. With reference to this FIG. 12, a flow will be exemplified in a case in which the advertising business or the advertiser 400 connects to the server system 600 via a packet switching network 220 and verifies the advertisement effectiveness by inputting the necessary information according to the specific form on a Web page or the like.

At first, a case in which the advertising business verifies the advertising effectiveness will be described, and an ID and a password with which the advertising business has been provided by the administrator are input in a login screen 900 to proceed to an advertising business management screen 911.

An advertising business list 912 is displayed in this advertising business management screen 911, and thereby, the advertising business that has been logged in is selected from that display to proceed to a list sorted by advertising businesses. The administrator can proceed to a list sorted by advertising businesses for all advertising businesses that have been displayed in this advertising business list 912.

A list of advertisers 400 who have entered into a contract with the advertising business is displayed as a list of advertisers 922 in this list sorted by advertising businesses, and the advertiser for which advertising effectiveness is desired to be verified is selected to proceed to a list sorted by advertisers' names.

The advertised information, which the advertiser has requested to provide, is organized by the identification number information 611A1 and displayed as an advertisement list 932 in this list sorted by advertisers. Additionally, the number of the communication log information 612A detected from the area for communication log information 612 in the database 610 according to the identification number information 611A1 is counted by the advertising effectiveness-verifying unit 623I of the CTI server device 620 and is thereafter displayed in the advertisement list 932 as the number of the communication log information for each advertised information.

Thereafter, according to the number of the communication log information displayed as above, the advertising business can ascertain which advertised information that has been provided to a specific advertiser 400 has produced the highest advertisement effectiveness, or in other words, which advertised information the user has received and made calls to the advertiser 400 the most frequently.

Next, a case in which the advertiser 400 verifies the advertising effectiveness will be described, and an ID and a password, with which the advertiser 400 has been provided by the administrator are input in a login screen 900 to proceed to an advertiser management screen 921.

An advertisers list 922 is displayed in this advertisers management screen 921, and thereby the advertiser 400, which has been logged in, is selected among that display to proceed a list sorted by advertising businesses 923.

A display sorted by the advertising businesses with which the advertiser has entered into a contract is made in this display screen sorted by advertising businesses 923, and thereby, the name of the advertising business for which the advertising effectiveness is desired to be verified is selected from among them to proceed to the advertisement list 932.

The advertised information, which has been provided by the advertising business that has made a contract with that advertiser 400, is organized by the identification number information 611A1, and displayed as an advertisement list 932, in this list sorted by advertisers. Additionally, the number of the communication log information 612A detected from the area for communication log information 612 in the database 610 according to the identification number information 611A1 is counted by the advertising effectiveness-verifying unit 623I of the CTI server device 620, and thereafter displayed in the advertisement list 932 as the number of the communication log information for each advertised information.

Thereafter, according to the number of the communication log information displayed as the above, the advertiser 400 can ascertain which advertising business has provided advertised information that has produced the highest advertisement effectiveness, or in other words, which advertised information the user has received and made calls to the advertiser 400 the most frequently.

The administrator can also display the advertisement list 932 from an advertisement management screen 931 in addition to the above-mentioned advertising business management screen 911 and advertiser management screen 921. Additionally, the display screen sorted by advertising businesses 933 or the display screen sorted by stores 934 can be proceeded from the advertisement list 932. Moreover, the administrator can also display a media list 942 from a media management screen 941.

According to the embodiment of the present invention, a call-connecting device or the like enables a user, who has received advertised information that has been provided, to have a conversation with an advertiser without being bothered with troublesome operations and being forced to wait for a long period due to the mechanism of an automatic response. Additionally, a call-connecting device or the like is capable of managing and ascertaining the effectiveness of advertising per advertised information if a plurality of sets of advertised information is provided.

According to the embodiment of the present invention, a user who has received advertised information that has been provided can have a conversation with an advertiser without being bothered with troublesome operations and being forced to wait for a long period due to an automatic response. Additionally, if a plurality of sets of advertised information is provided, the advertising effectiveness produced thereby can be managed and ascertained per advertised information.

A wide range of users can be attracted, because advertised information can also be provided to users who are unfamiliar with computer operations such as viewing a Web page through publications such as newspapers and magazines and broadcasts such as television and radio. Thereafter, calls made by users who have received such advertised information can be accepted. Additionally, if the advertisers themselves are not familiar with computer operations, the advertisements can be provided and the calls can be accepted even if they do not have a relevant Web page.

The demand for information management of a plurality of sets of advertised information per advertised information while telephone calls are being responded to by one telephone, and the demand for a number of calls for one set of advertised information to be responded to by a plurality of telephones can be satisfied.

It is possible to first respond to an incoming call and then play a recorded message such as "Please wait for a moment" for the user during the waiting time until the call from the user is connected to the advertiser, and it is also possible to not respond to an incoming call in order to prevent fees from being charged to the user.

If the telephone call is connected between the user and the advertiser after detecting that the advertiser has responded to the incoming call, the conversation between them can be reliably connected. There is no case in which a telephone call between the user and the advertiser is connected in situations in which the advertiser cannot respond to the incoming call. In addition, it is also possible to provide the advertiser with a guidance message such as "A telephone call is coming from [name or number]" when the advertiser is responding to an incoming call. This enables the advertiser to easily ascertain that the telephone call has been made by a user who has received the advertised information.

If telephone call history information is output or information of charges is generated according to at least one the call history or conversation history, the history information and the information of charges can be managed reliably and easily. The history information and information of charges can be managed not only in cases in which a conversation is held (i.e., the advertiser has responded to the incoming call) but also in cases in which the advertiser cannot respond to the incoming call.

If an error is detected according to the frequency of calls, frequent calls such as prank calls can be judged as errors. Subsequently, an error can be handled, for example, by not connecting the call from that particular user to the advertiser.

If an identification number is automatically generated, the identification number is managed reliably and conveniently without being duplicated and confused with the identification numbers. In a case in which a new advertiser utilizes this calling device, the identification number for that advertiser can be provided reliably and easily.

Only during a specific period, calls made by users are connected to the advertiser to prevent unnecessary calls from being connected to the advertiser. For example, it can be configured so that calls are connected only during business hours but not during times other than business hours.

An advertised information database (database) is recorded in a storage device by associating, with one data structure, contact destination number information regarding the contact destination number of an advertiser, and identification number information for identifying an advertisement such as agency information, advertising media information, and advertising time information.

Subsequently, a contact destination number associated with an identification number included in a telephone number as a call destination is recognized according to a table structure constituted by that database.

Additionally, the conversation history information generated by the connection between a user's telephone (a first telephone) and an advertiser's telephone (a second telephone) is associated with the identification number, and is thereafter recorded in a history-recording unit.

According to the information recorded in this conversation history information, the advertisers can verify which advertisement has evoked calls made by users from among a plurality of advertisements that they have provided.

This enables the advertisers to stop advertising during a period in which advertising effectiveness is low, as well as to obtain selection criteria for advertising media, agencies, and the like.

Moreover, agencies can also ascertain which advertising media is most effective according to the business type of the advertisers, and can thereby easily explain to the advertisers which advertisements can be expected to be effective.

Furthermore, agencies can charge advertisers appropriately according to the conversation history information from the users, so they can easily acquire increased usage.

The preferred embodiments of the present invention have been described as the above, but the present invention is not limited to these, and various variations and modifications may be made without departing from the spirit and scope of the present invention.

What is claimed as new and desired to be secured by Letters Patent of the United States is:

1. A call-connecting device, comprising:
    a database having an identification number and a contact destination number, as associated information,
    a storage device containing said database,
    a call-accepting unit configured to accept a call from a first telephone designating a number to connect a Computer Telephony Integration Server including the identification number as well as to extract the identification number from said number to connect to the Computer Telephony Integration Server,
    a contact destination-extracting unit configured to extract the contact destination number associated with said identification number from the database, according to said extracted identification number; and
    a connection-processing unit configured to connect the call from the first telephone to a second telephone corresponding to said contact destination number, according to said extracted contact destination number,
    wherein the number to connect to the Computer Telephony Integration Server includes:
        a telecommunications company-specific number of at least four digits, which has been allocated to a respective telecommunications company;
        a server-specific number of at least three digits, which has been allocated to a respective Computer Telephony Integration Server; and
        the identification number that is at least fourteen digits, which has been allocated to respective advertised information, said identification number including an agency number that indicates an agency that provides said advertised information and an advertisement-specific number that identifies said advertised information.

2. A call-connecting device according to claim 1, wherein the database has one identification number and a plurality of contact destination numbers, as associated information.

3. A call-connecting device according to claim 1, wherein the database has a plurality of identification numbers and one or a plurality of contact destination numbers, as associated information.

4. A call-connecting device according to claim 1, wherein the call-accepting unit extracts the identification number from the telephone number after making an incoming call response to the call.

5. A call-connecting device according to claim 1, wherein the call-accepting unit extracts the identification number from the telephone number without making an incoming call response to the call.

6. A call-connecting device according to claim 1, wherein the connection-processing unit comprises:
    a response-detecting unit configured to detect an incoming call response of the second telephone; and
    a conversation-connecting unit configured to connect a call from the first telephone to said second telephone so as to enable the conversation, according to the incoming call response of said second telephone.

7. A call-connecting device according to claim 6, further comprising a conversation-processing unit configured to transmit conversation voice information from one of the first telephone and the second telephone to the other telephone.

8. A call-connecting device according to claim 1, further comprising a history-recording unit configured to record at least either a history of the call or a history of a conversation connected by the connection-processing unit to the storage device, with association to the identification number.

9. A call-connecting device according to claim 8, further comprising a history-output unit configured to output telephone call history information corresponding to each of the identification numbers, according to at least the call history or the conversation history.

10. A call-connecting device according to claim 8, further comprising a charge-processing unit configured to generate information of charges corresponding to each of the identification numbers, according to at least the call history or the conversation history.

11. A call-connecting device according to claim 1, further comprising an error-detecting unit configured to detect an error according to a frequency of calls.

12. A call-connecting device according to claim 1, further comprising an identification number-generating unit configured to generate the identification number automatically.

13. A call-connecting device according to claim 1, further comprising a timer unit configured to measure a current time,
    wherein the connection-processing unit connects the call to a second telephone corresponding to said contact destination number, only in a case in which a time of the call, which has been measured by said timer unit, is within a range of a specific period.

14. A call-connecting device according to claim 13,
    wherein the database further has a connectable time for each of the contact destination numbers, as associated information of the identification number, and
    wherein the connection-processing unit connects the call to the second telephone corresponding to said contact destination number, only in a case in which the call time is within a connectable time.

15. A call-connecting method, comprising:
    accepting a call from a first telephone designating a number to connect to a Computer Telephony Integration Server including an identification number that has been stored within a database by being associated with a contact destination number,
    extracting the identification number from said number to connect to the Computer Telephony Integration Server,
    extracting the contact destination number associated with said identification number from the database, according to said extracted identification number; and
    connecting a call from the first telephone to a second telephone corresponding to the contact destination number, according to said extracted contact destination number,
    wherein the number to connect to the Computer Telephony Integration Server includes:
        a telecommunications company-specific number of at least four digits, which has been allocated to a respective telecommunications company;
        a server-specific number of at least three digits, which has been allocated to a respective Computer Telephony Integration Server; and the identification number that is at least fourteen digits, which has been allocated to respective advertised information, said identification number including an agency number that indicates an agency that provides said advertised information and an advertisement-specific number that identifies said advertised information.

16. A call-connecting method according to claim 15, wherein, in the step of extracting the identification number, the identification number is extracted from the telephone number after making an incoming call response to the call.

17. A call-connecting method according to claim 15, wherein, in the step of extracting the identification number, the identification number is extracted from the telephone number without making an incoming call response to the call.

18. A call-connecting method according to claim 15, wherein the step of connecting the call comprises:
  detecting an incoming call response of the second telephone; and
  connecting a call from the first telephone to said second telephone so as to enable a conversation, according to an incoming call response of said second telephone.

19. A call-connecting method according to claim 18, further comprising transmitting conversation voice information from the first telephone or the second telephone to the other telephone.

20. A call-connecting method according to claim 15, further comprising recording at least either a history of the call or a history of a conversation connected by the connection-processing unit to the storage device, with association to the identification number.

21. A call-connecting method according to claim 20, further comprising outputting telephone call history information corresponding to each of the identification numbers, according to at least the call history or the conversation history.

22. A call-connecting method according to claim 20, further comprising generating information of charges corresponding to each of the identification numbers, according to at least the call history or the conversation history.

23. A call-connecting method according to claim 15, further comprising detecting an error according to frequency of calls.

24. A call-connecting method according to claim 15, wherein, in the step of connecting the call, the call is connected to the second telephone corresponding to said contact destination number, only in a case in which a time of the call is within a range of a specific period.

25. A call-connecting program causes a computer to function as:
  a call-accepting unit for accepting a call from a first telephone designating a number to connect to a Computer Telephony Integration Server including an identification number that has been stored within a database by being associated with a contact destination number as well as for extracting the identification number from said number to connect to the Computer Telephony Integration Server,
  a contact destination-extracting unit for extracting the contact destination number associated with said identification number from the database, according to said extracted identification number; and
  a connection-processing unit for connecting the call from the first telephone to a second telephone corresponding to said contact destination number, according to said extracted contact destination number,
  wherein the number to connect to the Computer Telephony Integration Server includes:
    a telecommunications company-specific number of at least four digits, which has been allocated to a respective telecommunications company;
    a server-specific number of at least three digits, which has been allocated to a respective Computer Telephony Integration Server; and
    the identification number that is at least fourteen digits, which has been allocated to respective advertised information, said identification number including an agency number that indicates an agency that provides said advertised information and an advertisement-specific number that identifies said advertised information.

* * * * *